ization plate, a front retardation of the at least one optically

(12) United States Patent
Suzuki et al.

(10) Patent No.: US 8,493,659 B2
(45) Date of Patent: Jul. 23, 2013

(54) VIEWER AND KIT FOR AUTHENTICATING BIREFRINGENT PATTERN, AUTHENTICITY-VERIFYING MEDIUM AND METHOD OF VERIFYING AUTHENTICITY

(75) Inventors: Satomi Suzuki, Minami-ashigara (JP); Hideki Kaneiwa, Minami-ashigara (JP); Ichiro Amimori, Minami-ashigara (JP); Kouki Takahashi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 449 days.

(21) Appl. No.: 12/787,279

(22) Filed: May 25, 2010

(65) Prior Publication Data

US 2010/0302636 A1    Dec. 2, 2010

(30) Foreign Application Priority Data

May 26, 2009    (JP) .................................. 2009-126829

(51) Int. Cl.
 *G02B 5/30*    (2006.01)
(52) U.S. Cl.
 USPC .................................................... 359/489.01
(58) Field of Classification Search
 USPC  340/5.8; 349/175, 201; 348/222; 359/489.01
 See application file for complete search history.

(56) References Cited

U.S. PATENT DOCUMENTS

2008/0068402 A1\* 3/2008 Ioka et al. ..................... 345/660
2010/0026450 A1    2/2010 Hoshino et al.

FOREIGN PATENT DOCUMENTS

| DE | 10343547 A1 | 4/2005 |
|---|---|---|
| DE | 102004051919 A1 | 4/2006 |
| DE | 102006021429 A1 | 11/2007 |
| JP | 200-505738 A | 5/2000 |
| JP | 2007-101991 | 4/2007 |
| JP | 2008-070807 | 3/2008 |
| JP | 2008-116839 | 5/2008 |
| JP | 2008-513817 A | 5/2008 |
| JP | 2008-129421 A | 6/2008 |
| JP | 2008-137232 A | 6/2008 |
| JP | 2008-139508 | 6/2008 |
| JP | 2008-139510 | 6/2008 |
| JP | 2008-183832 | 8/2008 |
| JP | 2009-069793 | 4/2009 |

OTHER PUBLICATIONS

European Search Report dated Sep. 8, 2010 issued for the corresponding European Patent Application No. 10163885.6.
Japanese Office Action issued in Japanese Application No. 2009-126829 on Oct. 30, 2012 (submitted with English language translation).
Japanese Office Action issued in Japanese Patent Application No. 2009-146829 on Feb. 19, 2013.

\* cited by examiner

*Primary Examiner* — James Jones
(74) *Attorney, Agent, or Firm* — Birch, Stewart, Kolasch & Birch, LLP

(57) ABSTRACT

A viewer for authenticating a birefringent pattern having at least two regions having a different birefringence from each other, wherein the viewer contains a polarizing plate and at least one optically anisotropic layer laminated on the polarizing plate, a front retardation of the at least one optically anisotropic layer is 5 nm or more and the total of the front retardation of the at least one optically anisotropic layer and a maximum value of front retardation of the birefringent pattern is greater than $\lambda/2$.

20 Claims, 5 Drawing Sheets

(a)

(b)

(c)

VIEWER AND KIT FOR AUTHENTICATING BIREFRINGENT PATTERN, AUTHENTICITY-VERIFYING MEDIUM AND METHOD OF VERIFYING AUTHENTICITY

FIELD OF THE INVENTION

The present invention relates to a viewer and a kit for authenticating a birefringent pattern, and an authenticity-verifying medium and a method of verifying authenticity.

BACKGROUND OF THE INVENTION

Forgery-preventing means of products is broadly divided into means for making it impossible to copy products themselves and means for attaching an unreproducible label to products as forgery-preventing means so that true and correct products (authentic products) can be identified. Herein, "product" is a generic name of a produced item such as an article, a commodity and goods. In particular, the latter means is frequently used, because it is more generally versatile than the former means, which rather needs to be individually dealt with.

The latter means may be further divided into two techniques. One is a technique in which anyone can always identify the existence of forgery-preventing means, and a well known technique includes a hologram. The other is a technique in which forgery-preventing means is ordinarily undetectable, and only persons who know the existence of forgery-preventing means can detect it with special means to determine whether the product is authentic or not. A technique, in which authenticity is identified by observing, with a polarizing plate, a latent image formed using a phase difference medium in which an optical axis is patterned, is known (see, for example, JP-A-2008-137232 ("JP-A" means unexamined published Japanese patent application) and JP-A-2008-129421). However, there are problems in that the thus-visualized latent image is monochromatic when viewed from the front, and further authenticity can not be identified unless the polarizing plate is rotated, which makes authentication cumbersome and complicated.

SUMMARY OF THE INVENTION

The present invention resides in a viewer for authenticating a birefringent pattern having at least two regions having a different birefringence from each other, wherein the viewer comprises a polarizing plate and at least one optically anisotropic layer laminated on the polarizing plate, a front retardation of the at least one optically anisotropic layer is 5 nm or more and the total of the front retardation of the at least one optically anisotropic layer and a maximum value of front retardation of the birefringent pattern is greater than $\lambda/2$.

Further, the present invention resides in a kit for authenticating a birefringent pattern, wherein the kit comprises at least two viewers, at least one of the viewers being the viewer described above.

Further, the present invention resides in an authenticity-verifying medium comprising the viewer described above in a part of a member to be authenticated.

Further, the present invention resides in a method of verifying authenticity comprising using the viewer described above, or the kit for authenticating a birefringent pattern described above.

Other and further features and advantages of the invention will appear more fully from the following description, appropriately referring to the accompanying drawings.

BRIEF DESCRIPTION OF THE DRAWINGS

FIG. 3($a$) is an explanatory diagram of an example where patterning is performed with respect to retardation. FIG. 3($b$) is an explanatory diagram of an example where patterning is performed with respect to optical axis direction.

DETAILED DESCRIPTION OF THE INVENTION

Figure 1:
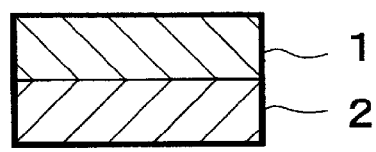
FIG. 1 is a schematic cross-sectional view showing a preferable embodiment of the viewer of the present invention.

According to the present invention, there are provided the following means:

(1) A viewer for authenticating a birefringent pattern having at least two regions having a different birefringence from each other, wherein the viewer comprises a polarizing plate and at least one optically anisotropic layer laminated on the polarizing plate, a front retardation of the at least one optically anisotropic layer is 5 nm or more and the total of the front retardation of the at least one optically anisotropic layer and a maximum value of front retardation of the birefringent pattern is greater than $\lambda/2$.

(2) The viewer as described in the above item (1), wherein the viewer identifies a birefringent pattern that is formed in terms of a direction of an optical axis.

(3) The viewer as described in the above item (2), wherein the front retardation of the birefringent pattern is in the range of $(n_1/2+1/8)\lambda$ to $(n_1/2+3/8)\lambda$, in which $n_1$ represents 0 or an integer greater than 0.

(4) The viewer as described in the above item (2) or (3), wherein the front retardation of the at least one optically anisotropic layer of the viewer is in the range of $(n_2/2-1/8)\lambda$, to $(n_2/2+1/8)\lambda$, in which $n_2$ represents a natural number.

(5) The viewer as described in the above item (1), wherein the viewer identifies a birefringent pattern in which retardation is patterned.

(6) A kit for authenticating a birefringent pattern, wherein the kit comprises at least two viewers, at least one of the viewers being the viewer as described in any one of the above items (1) to (5).

(7) The kit for authenticating a birefringent pattern as described in the above item (6), wherein the at least two viewers are different from each other in terms of at least one of optical axes and/or a retardation of an optically anisotropic layer arranged at the side of a member to be authenticated.

(8) An authenticity-verifying medium comprising the viewer as described in any one of the above items (1) to (5) in a part of a member to be authenticated.

(9) A method of verifying authenticity comprising using the viewer as described in any one of the above items (1) to (5), or the kit for authenticating a birefringent pattern as described in the above item (6) or (7).

(10) The method of verifying authenticity as described in the above item (9), comprising:

observing a member to be authenticated in which the birefringent pattern is formed in an authentic product through the viewer or the kit for authenticating a birefringent pattern, and confirming a latent image composed of at least three colors, thereby verifying authenticity of the member to be authenticated.

Some examples of preferable modes of the present invention are described below in detail.

The viewer of the present invention is a viewer for authenticating a birefringent pattern including at least two regions having a different birefringence from each other. The viewer includes a polarizing plate and at least one optically anisotropic layer laminated on the polarizing plate, wherein a front retardation of the at least one optically anisotropic layer is 5 nm or more and the total of the front retardation of the at least one optically anisotropic layer and a maximum value of front retardation of the birefringent pattern is greater than $\lambda/2$.

FIG. 1 is a schematic cross-sectional view of a preferable embodiment of the viewer (optical filter) of the present invention, in which optically anisotropic layer 2 is laminated on polarizing plate 1.

Polarizing plate 1 is a plate having a property to convert natural light to linearly-polarized light. Examples of polarizing plate 1 include an iodide-based polarizing plate, a dye-based polarizing plate, a wire grid polarizing plate, and a polarizing plate using metallic nanoparticles. Generally, it is preferable to use an iodide-based polarizing plate (that is produced by a method in which a polarizing film made of a polyvinyl alcohol film is dyed with iodine and stretched, and then a protective film is laminated on both surfaces of the polarizing film). The thickness of polarizing plate 1 is not particularly limited, and the range of 80 μm to 500 μm including a thickness of the protective film is preferable.

Optically anisotropic layer 2 is a layer having a front retardation of 5 nm or more, which is not substantially 0 (zero). The front retardation is preferably 50 nm or more, and more preferably 100 nm or more. Especially, in order to identify a birefringent pattern that is formed in terms of a direction of an optical axis, the front retardation is preferably in the range of $(n_2/2-1/8)\lambda$ to $(n_2/2+1/8)\lambda$, in which $n_2$ represents a natural number.

Herein, in the specification and claims of the present application, the term "retardation", "Re" or "phase difference" means an in-plane retardation, and the term "Re($\lambda$)" indicates a front retardation (in-plane retardation) at wavelength $\lambda$ (nm). The in-plane retardation (Re($\lambda$)) can be measured by making light of wavelength $\lambda$ nm incident in the direction of the normal of the film, in KOBRA WR (trade name, manufactured by Oji Scientific Instruments).

Further, in the specification and claims of the present application, the retardation with no definition of wavelength in particular means a value observed at the wavelength of 500 nm.

Examples of optically anisotropic layer 2 include a film-like article formed by a method in which a composition (coating liquid) containing a liquid-crystalline compound is coated on a transparent support via an alignment layer and dried to form a state of a liquid-crystalline phase, and then the alignment state is fixed. As the liquid crystal compound, for example, ultraviolet curable thermotropic nematic liquid crystals can be used. These liquid crystals are commercially available. Examples thereof include Paliocolor LC242 (trade name, manufactured by BASF Japan LTD).

Further, as optically anisotropic layer 2, commercially available uniaxially-stretched films or biaxially-stretched films each having a desired retardation may be used.

Optically anisotropic layer 2 is put on polarizing plate 1 with a pressure-sensitive adhesive such as gum adhesives, acrylic adhesives, silicone-series adhesives, urethane-series adhesives, polyether-series adhesives, or polyester-series adhesives, and they are laminated. Thus, a viewer is formed.

The thickness of the optically anisotropic layer 2 is not particularly limited, and is preferably 0.1 to 20 μm, and more preferably 0.5 to 10 μm.

The viewer of the present invention is used to authenticate a birefringent pattern having at least two regions exhibiting a different birefringence from each other.

Further, the term "authentication" used in the specification and claims of the present application encompasses proving authenticity of a member to be authenticated by an act such as "identification", "determination", "confirmation of presence", or the like.

In the present invention, it is required that the total of the front retardation of the optically anisotropic layer of a viewer and a maximum value of front retardation of the birefringent pattern is greater than $\lambda/2$. Setting the total value of retardation in the above range produces an effect that a hue of the latent image can be significantly changed. The total of the front retardation of the optically anisotropic layer of a viewer and a maximum value of front retardation of a patterned optically anisotropic layer of the birefringent pattern is preferably in the range of $\lambda/2$ to $3\lambda$, and more preferably from $\lambda$ to $2\lambda$. To increase the value of retardation so that the total of the front retardation of the optically anisotropic layer of a viewer and a maximum value of front retardation of a patterned optically anisotropic layer of the birefringent pattern is greater than $\lambda/2$ can be attained by, for example, increasing the maximum value of front retardation of a patterned optically anisotropic layer of the birefringent pattern, or increasing the front retardation of the optically anisotropic layer of a viewer, or alternatively increasing both of them at the same time. With respect to an optically anisotropic layer produced by curing a liquid-crystalline compound, the front retardation of the layer can be increased by increasing a film thickness of the layer or by using a liquid-crystalline material exhibiting a large anisotropy. With respect to a stretched film (drawn film), the front retardation of the film can be increased by increasing a draw ratio of the film.

The birefringent pattern that is authenticated by the viewer of the present invention has a layer containing at least two or more regions exhibiting a different birefringence from each other, namely a patterned optically anisotropic layer as mentioned above.

In the present invention, it is more preferable that the birefringent pattern has three or more regions exhibiting a different birefringence from each other. Individual regions in which the birefringence is the same may be a continuous form, or a discontinuous form. Further, the patterned optically anisotropic layer may be a laminate of two or more layers. Generally, the article having a birefringent pattern may have a plane form (film or sheet).

One of the preferable birefringent patterns that are authenticated by the viewer of the present invention is a birefringent pattern in which a direction of the optical axis is patterned. Namely, in this type of the birefringent pattern, the region having a different birefringence has at least two regions in which a direction of optical axis is different from each other. The term "optical axis" used in the specification of the present application means "slow axis" or "transmission axis".

When an optical axis is patterned, the patterning may be performed in such a manner that the directions of optical axis are different from each other in angle of preferably at least 5 degrees, more preferably at least 10 degrees, and further preferably at least 15 degrees. The optically anisotropic layer of the birefringent pattern in which an optical axis is patterned may be obtained according to the method described in, for example, JP-T-2001-525080 ("JP-T" means a published Japanese translation of PCT international application). Further, a combination of the control of intra-layer alignment direction and the control of retardation value described below makes it possible to produce an optically anisotropic layer in which intra-layer retardation and alignment direction are patterned arbitrarily.

When a pattern is formed for an optical axis, a phase difference of the birefringent pattern is preferably in the range of $(n_1/2+1/8)\lambda$ to $(n_1/2+3/8)\lambda$, in which $n_1$ represents 0 or an integer greater than 0. A hue of a latent image can be significantly changed by setting the phase difference of the birefringent pattern of the viewer in the above-described range. Control of the phase difference in the above-described range may be achieved by, for example, adjusting a film thickness of the patterned optically anisotropic layer or adjusting an intrinsic birefringence of the liquid crystal.

In authentication of the birefringent pattern that is formed for the direction of optical axis, the phase difference of an optically anisotropic layer of the viewer is preferably in the range of $(n_2/2-1/8)\lambda$, to $(n_2/2+1/8)\lambda$, in which $n_2$ represents a natural number. A hue of a latent image can be significantly changed by setting the phase difference of the optically anisotropic layer of the viewer in the above-described range. Control of the phase difference of the optically anisotropic layer of the viewer in the above-described range may be achieved, for example, by the following manner. When an optically anisotropic layer containing a cured crystalline compound is used, a film thickness of the patterned optically anisotropic layer is adjusted, or an intrinsic birefringence of the liquid crystal is adjusted. Alternatively, when a stretched film is used, a draw rate of the film is adjusted.

Another preferable birefringent pattern that is authenticated by the viewer of the present invention is a birefringent pattern in which retardation is patterned. The phrase "retardation is patterned" means to have at least two regions having a different retardation from each other. When retardation is patterned, the difference of retardation preferably is 20 nm or more, more preferably 30 nm or more, and further preferably 50 nm or more.

Figure 2:
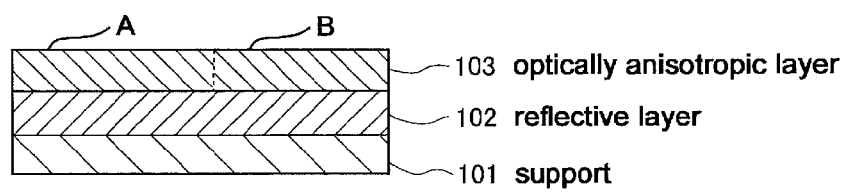
FIG. 2 is a schematic cross-sectional view of one exemplary embodiment of the member to be authenticated by a viewer of the present invention.

FIG. 2 shows a schematic cross-sectional view of one exemplary embodiment of the member to be authenticated by the viewer of the present invention. The member to be authenticated shown in FIG. 2 has optically anisotropic layer 103 through reflective layer 102 on support 101. Optically anisotropic layer 103 has regions A and B which are regions having a different birefringence from each other. The birefringent pattern, the optically anisotropic layer, and other layers that are disposed when needed are described in detail bellow.

Figure 3:
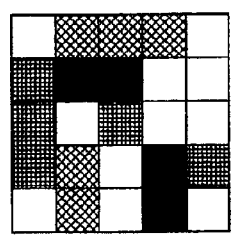
FIGS. 3($a$) and 3($b$) each are an explanatory diagram showing an example of the birefringent pattern to be authenticated by a viewer of the present invention.
Figure 3:
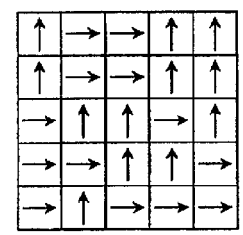

Examples of the birefringent pattern include articles in which retardation and/or direction of optical axis are patterned in a plane. Examples of the birefringent pattern are shown in FIG. 3.

FIG. 3(a) is a schematic explanatory diagram of an exemplary embodiment in which patterning is performed using a difference in retardation. In the exemplary embodiment shown in FIG. 3(a), retardations indicated by a nm, b nm, c nm, and d nm are regulated so as to be different from each other. FIG. 3(b) is a schematic explanatory diagram of an exemplary embodiment in which patterning is performed using a difference in the direction of optical axis. The arrow in FIG. 3(b) indicates the direction of optical axis.

The optically anisotropic layer in which an optical axis is patterned in a plane may be obtained according to the method described in, for example, JP-T-2001-525080.

The optically anisotropic layer in which retardation is patterned in a plane may be produced according to the method described in detail below.

The following description of the optically anisotropic layer can be applied to an optically anisotropic layer of the viewer, except for descriptions of the pattering.

[Birefringent Pattern Member]
(Optically Anisotropic Layer)

It is to be noted that the member to be authenticated contains a birefringent pattern member, which is explained below, in at least one part thereof.

The optically anisotropic layer is preferably made from substantially the same layer-forming composition. As used herein, the term "the same layer-forming composition" means that an electron state in the molecule differs in a precise sense and birefringence property differs, but the raw materials are identical.

The birefringent pattern includes at least one patterned optically anisotropic layer.

The patterned optically anisotropic layer contains a polymer. By containing the polymer, the patterned optically anisotropic layer can meet various kinds of requirements such as birefringence, transparency, solvent-resistance, toughness, and flexibility.

The optically anisotropic layer may be solid at 20° C., preferably at 30° C., and more preferably at 40° C., because an optically anisotropic layer which is solid at 20° C. can readily be applied with another functional layer, or transferred or stuck onto a support.

In order to be applied with another functional layer, the optically anisotropic layer of the present invention is preferred to have solvent-resistance. In the present specification, "to have solvent-resistance" means that the retardation of the layer after soaked in the subject solvent for two minutes is in the range of 30% to 170%, more preferably 50% to 150%, most preferably 80% to 120%, with respect to the retardation of the layer before the soaking. As the subject solvent, examples include water, methanol, ethanol, isopropanol, acetone, methyl ethyl ketone, cyclohexanone, propyleneglycolmonomethyletheracetate, N-methylpyrrolidone, hexane, chloroform, and ethyl acetate. Among them, acetone, methyl ethyl ketone, cyclohexanone, propyleneglycol monomethylether acetate, and N-methylpyrrolidone are preferable; and methyl ethyl ketone, cyclohexanone, propyleneglycol monomethylether acetate, and a mixture thereof are most preferable.

The retardation value of the regions where retardation is imparted in the optically anisotropic layer may be 5 nm or more, preferably 20 nm or more and 1,000 nm or less at 20° C. If the retardation is too small, it may be difficult to form a birefringent pattern or the latent image may have reduced clarity in some cases. If the retardation is too large, error becomes larger and it may become difficult to achieve practically needed accuracy.

The retardation value of the optically anisotropic layer may be controlled taking into account the formation of the latent image in the member to be authenticated or the retardation of any other layer that constitutes the member to be authenticated.

Although the production method of the optically anisotropic layer is not particularly limited, methods shown below may be exemplified.

a) A method of producing an optically anisotropic layer by coating and drying a liquid containing a liquid-crystalline compound having at least one reactive group to form a liquid-crystalline phase, and then by polymerizing and fixing the compound by applying heat or irradiating ionizing radiation to the liquid-crystalline phase.

b) A method of stretching a layer obtained by polymerizing and fixing a monomer having at least two or more reactive groups.

c) A method of introducing a reactive group into a layer made of a polymer by a coupling agent to subsequently stretch the layer.

d) A method of stretching a layer made of a polymer to subsequently introduce a reactive group into the layer by a coupling agent.

Further, as explained below, the optically anisotropic layer according to the present invention may be formed by transfer.

The thickness of the patterned optically anisotropic layer is preferably 0.1 to 20 μm, and more preferably 0.5 to 10 μm.

《Optically Anisotropic Layer (Material)》
(Optically Anisotropic Layer formed by Polymerizing and Fixing Composition Comprising Liquid-Crystalline Compound)

The production method of the optically anisotropic layer is explained below, wherein coating with a liquid comprising a liquid-crystalline compound having at least one reactive group is conducted and the liquid is dried to thereby form a liquid-crystalline phase, and then the liquid-crystalline phase is polymerized and fixed by applying heat or irradiating ionizing radiation. As compared with the method described later for producing the optically anisotropic layer by stretching a polymer, this method makes easy to produce the optically anisotropic layer with a small thickness and the same retardation, or to control sophisticated pattern.

(Liquid-Crystalline Compound)

The liquid-crystalline compounds can generally be classified by molecular shape into rod-like one and discotic one. Each category further includes low-molecular type and high-molecular type. The high-molecular type generally refers to that having a degree of polymerization of 100 or more ("Kobunshi Butsuri-Soten'i Dainamikusu (Polymer Physics-Phase Transition Dynamics), by Masao Doi, p. 2, published by Iwanami Shoten, Publishers, 1992). Either type of the liquid-crystalline compound may be used in the optically anisotropic layer of the birefringent pattern, wherein it is preferable to use a rod-like liquid-crystalline compound or a discotic liquid-crystalline compound. A rod-like liquid-crystalline compound is preferably used in order to develop a large retardation. A mixture of two or more kinds of rod-like liquid-crystalline compounds, a mixture of two or more kinds of discotic liquid-crystalline compounds, or a mixture of a rod-like liquid-crystalline compound and a discotic liquid-crystalline compound may also be used. In the present invention, liquid-crystalline compounds similar to those used in the optically anisotropic layer of the viewer may be preferably used. It is more preferable that the optically anisotropic layer is formed using a rod-like liquid-crystalline compound having a reactive group or a discotic liquid-crystalline compound having a reactive group, because such a compound can reduce temperature- or moisture-dependent changes; and it is still further preferable that the optically anisotropic layer is formed using a compound having two or more reactive groups of at least one kind in a single liquid-crystalline molecule.

It is also preferred that a liquid-crystalline compound has two or more kinds of reactive groups which have different polymerization condition from each other. In such a case, an optically anisotropic layer containing a polymer having an unreacted reactive group can be produced by only polymerizing a specific kind of reactive group among plural types of reactive groups by selecting polymerization condition. The polymerization condition to be employed may be wavelength range of the irradiation of ionized radiation for the polymerization and fixing, or mechanism of polymerization. Preferably, the condition may be polymerization initiator, which can control polymerization of compound having a combination of a radically reactive group and a cationically reactive group from the view point of controlling selective polymerization. The combination of an ethylenically unsaturated group, particularly, acrylic group and/or methacrylic group as the radically reactive group, and vinyl ether group, oxetane group, and/or epoxy group as the cationically polymerizable group is particularly preferred, because the reactivity can be controlled easily.

In the invention, the final product made from the liquid-crystalline compound does not have to exhibit liquid-crystalline properties. For example, it may be a polymeric product that has lost the liquid-crystalline properties in the process of polymerizing or crosslinking of a thermally- or photo-reactive group-containing low-molecular discotic liquid-crystalline by a thermal reaction, a photo-reaction or the like.

As the rod-like liquid-crystalline compounds, for example, compounds described in paragraphs [0043] to [0060] of JP-A-2008-281989 may be used.

In another embodiment of the present invention, a discotic liquid crystal is used in the optically anisotropic layer. The optically anisotropic layer is preferably a layer of a low-molecular-weight liquid-crystalline discotic compound such as monomer or a layer of a polymer obtained by polymerization (curing) of a polymerizable liquid-crystalline discotic (disk-like) compound. As the discotic liquid-crystalline compound, for example, compounds described in paragraphs [0061] to [0075] of JP-A-2008-281989 may be used.

The optically anisotropic layer is preferably a layer formed according to a method comprising applying a composition containing liquid-crystalline compound (e.g., a coating liquid) to a surface of an alignment layer, described in detail later, making an aligned state exhibiting a desired crystalline phase, and fixing the aligned state under applying heating or irradiating ionizing radiation.

When a discotic liquid-crystalline compound having reactive groups is used as the liquid-crystalline compound, the discotic compound in the layer may be fixed in any alignment state such as a horizontal alignment state, vertical alignment state, tilted alignment state, and twisted alignment state. In the present specification, the term "horizontal alignment" means that, regarding rod-like liquid-crystalline molecules, the molecular long axes thereof and the horizontal plane of a transparent support are parallel to each other, and, regarding discotic liquid-crystalline molecules, the disk-planes of the cores thereof and the horizontal plane of a transparent support are parallel to each other. However, they are not required to be exactly parallel to each other, and, in the present specification, the term "horizontal alignment" should be understood as an alignment state in which molecules are aligned with a tilt angle against a horizontal plane less than 10°. The tilt angle is preferably from 0° to 5°, more preferably 0° to 3°, much more preferably from 0° to 2°, and most preferably from 0° to 1°.
(Horizontal Alignment Agent)

In order to substantially horizontally align molecules of liquid-crystalline compounds, a horizontal alignment agent may be added with reference to the descriptions in paragraphs [0084] to [0093] of JP-A-2008-281989.

When two or more optically anisotropic layers formed of the compositions containing liquid-crystalline compounds are laminated, the combination of the liquid-crystalline compounds is not particularly limited, and the combination may be a laminate formed of layers all comprising discotic liquid-crystalline compounds, a laminate formed of layers all comprising rod-like liquid-crystalline compounds, or a laminate formed of a layer comprising compositions containing discotic liquid-crystalline compounds and a layer comprising compositions containing rod-like liquid-crystalline compounds. Further, combination of alignment state of the individual layers is not particularly limited, allowing laminating of the optically anisotropic layers having the same alignment states, or laminating of the optically anisotropic layer having different alignment states.

The optically anisotropic layer is preferably formed by applying a coating liquid, which contains at least one liquid-crystalline compound, the following polymerization initiator and other additives, on a surface of an alignment layer described below. Organic solvents are preferably used as a solvent for preparing the coating liquid, and examples thereof include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methylethylketone), and ethers (e.g., tetrahydrofuran, 1,2-dimethoxyethane). Alkyl halides and ketones are preferable. Two or more kinds of organic solvents may be used in combination.
(Fixing Alignment State of Liquid-Crystalline Compounds)

It is preferable that the aligned liquid-crystalline compounds are fixed while keeping the alignment state according to the method described in paragraphs [0080] to [0081] of JP-A-2008-281989.
(Alignment Induced by Irradiation of Polarized Light (Photo-Alignment))

The optically anisotropic layer may be a layer in which in-plane retardation has been developed or increased due to photo-alignment induced by irradiation of polarized light, as described in paragraphs [0082] to [0083] of JP-A-2008-281989.

The optically anisotropic layer where the direction of optical axis is patterned in a layer may be obtained, for example, by the method described in JP-T-2001-525080.

A description is given below of an optically anisotropic layer having a birefringent pattern in which a liquid-crystalline compound is aligned in a substantially constant direction. This is an example of patterning in which the retardation value is controlled, while the liquid-crystalline compound in the layer is aligned in the same direction. By a combination of the retardation value control and the control of the direction of the alignment of the liquid-crystalline compound in the layer described above, an optically anisotropic layer having a desired pattern of retardations and alignment directions can be produced.

The polymer in the optically anisotropic layer prior to patterning is preferred to have an unreacted reactive group. Although light exposure leads to crosslinking of the polymer chain by reaction of unreacted reactive groups, the degree of crosslinking of the polymer chain varies by exposure under different exposure conditions. Consequently light exposure leads to fluctuation in retardation, thus making it easier to prepare such a patterned birefringent product.
(Fixing the Alignment State of Liquid-Crystalline Compounds Having Radically Reactive Group and Cationically Reactive Group)

As described above, it is also preferred that liquid-crystalline compound has two or more kinds of reactive groups which have different polymerization condition from each other. In such a case, an optically anisotropic layer containing a polymer having an unreacted reactive group can be produced by polymerizing only one kind of reactive groups among plural kinds of reactive groups by selecting polymerization condition. The conditions of polymerization and fixation, which are particularly suitable when the liquid-crystalline compounds having radically reactive group and cationically reactive group, as such a liquid-crystalline compound, are explained below.

First, as the polymerization initiator, only a photopolymerization initiator which acts on a reactive group intended to be polymerized is preferred to be used. That is, it is preferred that, only radical photopolymerization initiator is used when radically reactive groups are selectively polymerized, and only cationic photopolymerization initiator is used when cationically reactive groups are selectively polymerized. The amount of the photopolymerization initiator falls in the range preferably from 0.01% to 20% by mass, more preferably from 0.1% to 8% by mass, and further preferably from 0.5% to 4% by mass of the total solid content in the coating liquid.

Second, light irradiation for the polymerization is preferably conducted by using ultraviolet light. When the irradiation energy and/or illuminance are too high, non-selective reaction of both of the radically reactive group and cationically reactive group is of concern. In view of the above, the irradiation energy is preferably 5 mJ/cm$^2$ to 500 mJ/cm$^2$, more preferably 10 mJ/cm$^2$ to 400 mJ/cm$^2$, and particularly preferably 20 mJ/cm$^2$ to 200 mJ/cm$^2$. The illuminance is preferably 5 mW/cm$^2$ to 500 mW/cm$^2$, more preferably 10 mW/cm$^2$ to 300 mW/cm$^2$, and particularly preferably 20 mW/cm$^2$ to 100 mW/cm$^2$. As the irradiation wavelength, the light has a peak falling within the range preferably from 250 nm to 450 nm, more preferably from 300 nm to 410 nm.

Among photopolymerization reaction, the reaction by using a radical photopolymerization initiator is inhibited by oxygen, and the reaction by using a cationic photopolymerization initiator is not inhibited by oxygen. Therefore, when one of the reactive groups of the liquid-crystalline compounds having radically reactive group and cationically reactive group is selectively reacted, it is preferred that the light irradiation is carried out in an atmosphere of inert gas such as nitrogen gas when the radically reactive group is selectively reacted, and in an atmosphere containing oxygen (for example, in air atmosphere) when the cationically reactive group is selectively reacted.
[Production of Birefringent Patterned Member]

A builder that is used to form the birefringent pattern member (hereinafter referred to as "birefringent pattern builder") is a material used to form the birefringent pattern, with which the birefringent pattern member is obtained through a predetermined process. By using the method including a step of using the birefringent pattern builder to conduct a pattern-like heat treatment or irradiation of ionizing radiation and a step of causing the remaining unreacted reactive group in the optically anisotropic layer to react or deactivate, a birefringent patterned member can be produced. In particular, when the optically anisotropic layer has a retardation disappearance temperature and the retardation disappearance temperature increases by the irradiation of ionizing radiation (or the heat treatment at a temperature equal to or lower than the retardation disappearance temperature), a birefringent patterned member can be produced easily.

The process of forming the birefringent pattern by irradiation of ionizing irradiation or heat treatment is illustrated by an example below.

The pattern-like irradiation of ionizing radiation may be, for example, exposure to light (patterned light exposure). The patterned light exposure is conducted to cause an unreacted reactive group in the optically anisotropic layer to react, and to thereby cause an exposed region to have an increased retardation disappearance temperature. Thereafter, a step of causing the remaining unreacted reactive group in the optically anisotropic layer to react or deactivate is conducted at a temperature higher than the retardation disappearance temperature of the not-exposed region and lower than the retardation disappearance temperature of the exposed region. As a result, only the retardation of the not-exposed region can be selectively caused to disappear to thereby form a birefringent pattern. The step of causing a remaining unreacted reactive group in the optically anisotropic layer to react or deactivate may be an overall exposure or an overall heat treatment (baking) if the reactive group also can be caused to react by heat. For saving cost, the heating at a temperature higher than the retardation disappearance temperature of the not-exposed region and lower than the retardation disappearance temperature of the exposed region also can preferably provide a heat treatment for reaction.

The pattern-like heat treatment also may be conducted by another method as described below. In this method, a region is firstly heated at a temperature close to the retardation disappearance temperature to reduce or eliminate the retardation. Thereafter, the step of causing a remaining unreacted reactive group in the optically anisotropic layer to react or deactivate (overall exposure or overall heating) at a temperature lower than the retardation disappearance temperature to thereby obtain a birefringent pattern. In this case, a pattern can be obtained in which the retardation of only the firstly-heated region is lost.

The pattern exposure and the pattern-like heat treatment are described in detail bellow.

The term "reaction conditions" in the present invention refers to conditions for the "pattern exposure" or "pattern-like heat treatment" described below.

First, the production of a birefringent pattern by a pattern-like exposure and an overall heat treatment or an overall exposure at a temperature equal to or higher than the retardation disappearance temperature will be described in detail.

[Patterned Light Exposure]

The patterned light exposure for producing a birefringent pattern may be conducted so as to form only an exposed region and a not-exposed region so that a region in the birefringent pattern builder in which birefringence properties are desired to be left is exposed. Alternatively, exposures based on different exposure conditions also may be conducted in a patterned manner.

The method of patterned light exposure may be a contact light exposure using a mask, proximity light exposure, projected light exposure, or direct drawing by focusing on the predetermined point by using laser or electron beam without a mask. The irradiation wavelength of the light source for the light exposure preferably has a peak in the range of 250 to 450 nm, and more preferably in the range of 300 to 410 nm. When a photosensitive resin layer is used to form different levels (unevenness) at the same time, it is also preferred that light in a wavelength region at which the resin layer can be cured (e.g., 365 nm, 405 nm) is irradiated to the resin layer. Specific examples of the light source include extra-high voltage mercury lamp, high voltage mercury lamp, metal halide lamp, and blue laser. Exposure quantity generally falls in the range preferably from about 3 mJ/cm$^2$ to about 2,000 mJ/cm$^2$, more preferably from about 5 mJ/cm$^2$ to about 1,000 mJ/cm$^2$, further preferably from about 10 mJ/cm$^2$ to about 500 mJ/cm$^2$, and most preferably from about 10 mJ/cm$^2$ to about 100 mJ/cm$^2$.

Examples of the parameters of the exposure conditions include, but are not particularly limited thereto, exposure peak wavelength, exposure illuminance, exposure time period, exposure quantity, exposure temperature, exposure atmosphere, and the like. Among them, exposure peak wavelength, exposure illuminance, exposure time period, and exposure quantity are preferable, and exposure illuminance, exposure time period, and exposure quantity are more preferable, from the viewpoint of convenience in adjusting the conditions.

The light exposure having different exposure conditions may be performed by a plurality of exposures, or by single exposure by using, for example, a mask having two or more regions having transmission spectra different from each other, or alternatively by exposure in combination thereof. The expression that the light exposure having different exposure conditions are conducted in a patterned manner means that the light exposure is conducted so that two or more exposure regions exposed under different exposure conditions are generated.

Regions exposed under different exposure conditions upon pattern exposure have, after baking, different birefringence property, in particular, different retardation values that are controlled by the exposure conditions. It is thus possible to produce birefringent patterns having desired retardation values which are different from each other between the regions after baking, by adjusting the exposure condition at the respective region upon pattern exposure. The exposure condition for the two or more exposure regions exposed under different exposure conditions may be changed discontinuously or continuously.

(Mask Exposure)

Exposure by using an exposure mask is useful as a means for forming exposure regions different in exposure conditions. For example, it is possible to change readily the exposure conditions between the region subjected to the first time exposure and the region subjected to the second time exposure, by exposing firstly only one region by using an exposure mask, and then exposing secondly the other region or the entire surface by using another mask, while the temperature, atmosphere, exposure illuminance, exposure time period, or exposure wavelength is changed from that in the first time exposure. A mask having two or more regions respectively showing different transmission spectra is particularly useful as the mask for modifying the exposure illuminance or the exposure wavelength. In that case, multiple regions may be exposed to light under conditions different in exposure illuminance or exposure wavelength from each other, only by a single exposure operation. It is of course possible to obtain different exposure quantities by subjecting to exposure for the same time period under different exposure illuminances.

If scanning exposure, for example, with laser is used, it is possible to change the exposure conditions in the respective regions, for example, by changing the light source intensity or the scanning speed depending on the exposure regions.

Further, the method of the present invention may be combined with the steps, in which a transferring material for producing another birefringent pattern is transferred on the laminated structure obtained by conducting patterned light exposure to a birefringent pattern builder, and then another patterned light exposure is conducted. The retardation values retained after baking can be effectively changed among the region which is a non-light-exposed region both in the first and second exposures (generally having the lowest retardation value), the region which is a light-exposed region in the first exposure but a non-light-exposed region in the second exposure, and the region which is a light-exposed region both in the first and second exposures (generally having the highest retardation value). On the other hand, the region which is unexposed at the first time but is exposed at the second time is considered to be equal, upon the second time, to the region which is exposed at both the first and second times. In a similar manner, four or more regions can be readily formed, by conducting transfer and patterned light exposure alternately three, four or more times. The above-mentioned method is useful when the different regions desirably have a difference (such as a difference in the direction of optical axis or very large difference in retardation) that cannot be provided only by modification of the exposure conditions.

[Reaction Processing by Overall Heat Treatment (Baking) or Overall Exposure at Temperature Equal to or Higher than Retardation Disappearance Temperature]

In order that the birefringent pattern builder subjected to the patterned light exposure is processed so the not-exposed region has a reduced retardation while retaining the retardation of the exposed region and in order to cause the remaining unreacted reactive groups to react or deactivate while this state is being maintained to thereby obtain a stable birefringent pattern, an overall heat treatment or an overall exposure at a temperature equal to or higher than the retardation disappearance temperature of the not-exposed region is preferably conducted.

When the processing is conducted by an overall heat treatment, although temperature conditions vary depending on the material, the processing is preferably performed at a temperature equal to or higher than the retardation disappearance temperature of the not-exposed region and equal to or lower than the retardation disappearance temperature of the exposed region. Further, the temperature is also preferably a temperature that efficiently promotes the reaction or deactivation of the unreacted reactive group. Specifically, although not particularly limited, a heat treatment at about 50° C. to 400° C. is preferred, a heat treatment at about 100° C. to 260° C. is more preferred, a heat treatment at about 150° C. to 250° C. is further preferred, and a heat treatment at about 180° C. to 230° C. is particularly preferred. However, a suitable temperature varies depending on required birefringence properties (retardation) or the thermal curing reactivity of the optically anisotropic layer to be used. The heat treatment also can be expected to provide an effect of evaporating or burning unnecessary components in the material. Although the time of the heat treatment is not particularly limited, the time of 1 minute or more and 5 hours or less is preferred, the time of 3 minutes or more and 3 hours or less is more preferred, and the time of 5 minutes or more and 2 hours or less is particularly preferred.

When a temperature equal to or lower than the retardation disappearance temperature of the exposed region causes an insufficient reactivity of an unreacted reactive group to thereby suppress the reaction processing from progressing sufficiently, for example, it is also useful to conduct an overall exposure while maintaining a temperature equal to or higher than the retardation disappearance temperature of the not-exposed region. In this case, a preferred light source is the same as that described in the patterned light exposure. An exposure quantity is generally preferably about 3 mJ/cm$^2$ to 2,000 mJ/cm$^2$, more preferably about 5 mJ/cm$^2$ to 1,000 mJ/cm$^2$, further preferably about 10 mJ/cm$^2$ to 500 mJ/cm$^2$, and most preferably about 10 mJ/cm$^2$ to 300 mJ/cm$^2$.

Next, a detailed description is given of the production of the birefringent pattern by pattern-like heat treatment to cause a patterned reduction in retardation and by overall heat treatment at a temperature equal to or lower than the retardation disappearance temperature or overall exposure.

[Pattern-Like Heat Treatment (Writing of Heat Pattern)]

The heating temperature of pattern-like heat treatment is not limited and may be any temperature so long as the temperature causes a heated part and a non-heated part to have different retardations. When a heated part desirably has retardation of substantially 0 nm in particular, it is preferred to conduct the heating at a temperature equal to or higher than the retardation disappearance temperature of the optically anisotropic layer of the birefringent pattern builder used. On the other hand, the heating temperature is preferably lower than a temperature at which the optically anisotropic layer is burned or colored. The heating may be generally performed at a temperature in a range from about 120° C. to about 260° C., more preferably in a range from 150° C. to 250° C., and further preferably in a range from 180° C. to 230° C.

Although the method of heating a part (region) of a birefringent pattern builder is not particularly limited, such methods may be used including a method of causing a heating body to have a contact with a birefringent pattern builder, a method of providing or placing a heating body in the close vicinity of a birefringent pattern builder, and a method of using a heat mode exposure to partially heat a birefringent pattern builder.

[Reaction Processing by Overall Heat Treatment (Baking) at Temperature Equal to or Lower than Retardation Disappearance Temperature or Overall Exposure]

A region that is in an optically anisotropic layer subjected to the pattern-like heat treatment and not subjected to a heat treatment still includes an unreacted reactive group while retaining the retardation, and thus is still in an unstable state. In order to react or deactivate the unreacted reactive group remaining in the not-treated region, a reaction processing by an overall heat treatment or an overall exposure is preferably conducted.

The reaction processing by an overall heat treatment is conducted preferably at a temperature that is lower than the retardation disappearance temperature of an optically anisotropic layer of the birefringent pattern builder used, and that efficiently promotes the reaction or deactivation of the unreacted reactive group.

Birefringent pattern can be produced by applying heat to the birefringent pattern builder after patterned light exposure at 50° C. or higher and 400° C. or lower, preferably 80° C. or higher and 400° C. or lower. When the retardation disappearance temperature of the optically anisotropic layer in the birefringent pattern builder used for forming birefringent pattern before the light exposure is designated as T1 (° C.), and the retardation disappearance temperature after the light exposure as T2 (° C.), (provided that when the retardation disappearance temperature is not in the range of the temperature of 250° C. or lower, T2=250), the temperature of baking is preferably T1° C. or higher and T2° C. or lower, more preferably (T1+10)° C. or higher and (T2−5)° C. or lower, and most preferably (T1+20)° C. or higher and (T2−10)° C. or lower.

Generally, the heating at about 120° C. to 180° C. may be conducted, 130° C. to 170° C. is more preferred, and 140° C. to 160° C. is further preferred. However, a suitable temperature varies depending on required birefringence properties (retardation) or the thermal curing reactivity of an optically anisotropic layer used. The time of the heat treatment is not particularly limited. The time of the heat treatment is preferably 1 minute or more and 5 hours or less, the time of 3 minutes or more and 3 hours or less is more preferred, and the time of 5 minutes or more and 2 hours or less is particularly preferred.

By baking, the retardation in the region unexposed to light in the birefringent pattern builder lowers, whereas the retardation in the region exposed to light, in which retardation disappearance temperature has risen by the previous patterned light exposure, lowers only slightly, absolutely does not lower, or rises. As a result, the retardation in the region unexposed to light is smaller than that in the region exposed to light, enabling production of birefringent pattern (a patterned optically anisotropic layer).

To produce an optical effect, the exposed region after baking preferably has a retardation of 5 nm or more, more preferably 10 nm or more and 5,000 nm or less, most preferably 20 nm or more and 2,000 nm or less. If the retardation is too small, it may be difficult to visually identify the prepared birefringent pattern.

To produce an optical effect, the unexposed region in the birefringent pattern builder after baking also preferably has a retardation of 80% or less, more preferably 60% or less, even more preferably 20% or less of that before baking, most preferably less than 5 nm. In particular, a retardation of less than 5 nm after baking gives the impression as if there was visually completely no birefringent pattern in the region. This makes it possible to present black under crossed nicols, and present colorlessness under parallel nicols or on a combination of a polarizing plate and a reflective plate. In this way, the birefringent pattern builder capable of forming an unexposed region with a retardation of less than 5 nm after baking is useful when the birefringent pattern is used to present a color image or when a laminate of layers of different patterns is used.

The reaction processing also can be conduced by an overall exposure instead of the overall heat treatment. In this case, the irradiation wavelength of a light source preferably has a peak in a range from 250 nm to 450 nm and more preferably in a range from 300 nm to 410 nm. When a photosensitive resin layer is used to form different levels at the same time, irradiation of light having a wavelength region at which the resin layer can be cured (e.g., 365 nm, 405 nm) is also preferred. Specific examples of the light source include extra-high-pressure mercury lamp, high-pressure mercury lamp, metal halide lamp, and blue laser. Exposure quantity generally falls in the range preferably from about 3 mJ/cm$^2$ to about 2,000 mJ/cm$^2$, more preferably from about 5 mJ/cm$^2$ to about 1,000 mJ/cm$^2$, further preferably from about 10 mJ/cm$^2$ to about 500 mJ/cm$^2$, and most preferably from about 10 mJ/cm$^2$ to about 300 mJ/cm$^2$.

Alternatively, another transferring material for producing birefringent pattern builder may be transferred on the birefringent pattern builder which has been baked, and then a patterned light exposure and baking may be conducted thereon. In this case, the retardation values after the second baking can be effectively changed between the region which is unexposed to light both in the first and second exposure, the region which is exposed to light in the first exposure and region unexposed to light in the second exposure, the region which is a region unexposed to light in the first exposure and region exposed to light in the second exposure (the retardation of the region unexposed to light in the first exposure already disappears due to the baking), and the region which is exposed to light both in the first and second exposure. This method is useful when two regions having birefringence property of different slow-axis directions from each other are needed to be formed without overlap to each other.

[Finishing Heat Treatment]

When the birefringent pattern produced by the steps according to the preceding sections is desired to have a further-improved stability, a finishing heat treatment also may be performed for the purpose of further reacting unreacted reactive groups still remaining after the fixing to increase the durability, and for the purpose of evaporating or burning an unnecessary component in the material to remove such a component. In particular, the finishing heat treatment is effective when a birefringent pattern is produced by a patterned light exposure and an overall heating or by a pattern-like heat treatment and an overall exposure. The finishing heat treatment may be performed at a temperature from about 180° C. to about 300° C., more preferably from 190° C. to 260° C., and further preferably from 200° C. to 240° C. The time of the heat treatment is not particularly limited. However, the time of the heat treatment is preferably 1 minute or more and 5 hours or less, more preferably 3 minutes or more and 3 hours or less, and particularly preferably 5 minutes or more and 2 hours or less.

(Optically Anisotropic Layer Produced by Stretching)

The optically anisotropic layer may be produced by stretching a polymer. When a polymer in the optically anisotropic layer, which is preferred to have at least one unreacted reactive group, is produced, a polymer having a reactive group may be stretched or a reactive group may be introduced by using a coupling agent or the like to an optically anisotropic layer prepared by stretching. The characteristics of the optically anisotropic layer obtained by stretching include low cost, self-supporting property (a support is not needed when the layer is formed or maintained), and the like.

(Post-Treatment of Optically Anisotropic Layer)

Various post-treatments may be conducted to modify the optically anisotropic layer produced. Examples of the post treatments include corona treatment for improving adhesiveness, addition of a plasticizer for improving plasticity, addition of a heat polymerization inhibitor for improving storage stability, and coupling treatment for improving reactivity. When the polymer in the optically anisotropic layer has an unreacted reactive group, addition of a polymerization initiator suited to the reactive group may also be a useful modification method. For example, by addition of a radical photopolymerization initiator to an optically anisotropic layer fixed by polymerization of a liquid-crystalline compound having a cationically reactive group and a radically reactive group by using a cationic photopolymerization initiator, the reaction of the unreacted radically reactive group in the patterned light exposure afterward can be promoted. As the method of addition of the plasticizer or the photopolymerization initiator, examples include immersing the optically anisotropic layer in a liquid of the desired additive, and applying a liquid of the desired additive to the optically anisotropic layer for the permeance of the liquid. Further, when another layer is applied to the optically anisotropic layer, the desired additive may be added to the coating liquid of the layer for permeance to the optically anisotropic layer. In the present invention, it is possible, by properly selecting the kind and the amount of the additive used for penetration, in particular, of the photopolymerization initiator, to adjust the relationship between the exposure quantity to respective regions during pattern exposure of the birefringent pattern builder and the retardation of the regions finally obtained and thus make the final product have material properties closer to desirable values.

(Constituent Material of Birefringent Pattern Member other than Optically Anisotropic Layer)

The birefringent pattern builder may generally be in a shape of film or sheet from the view point of manufacturing adaptability and the like. The birefringent pattern builder may include a functional layer which can be applied with various accessory function, other than the optically anisotropic layer. Examples of the functional layer include a support, an alignment layer, and a post-adhesive layer. Alternatively, the birefringent pattern member may be in the form of a foil.

Layers other than the optically anisotropic layer constituting a member to be authenticated are formed so as to have a retardation not affecting the formation of the latent image. Alternatively, the value of the retardation of the optically anisotropic layer to form the latent image may be set taking into account the retardation of these layers.

[Support]

The birefringent pattern member preferably has a transparent support or a reflective support. When the latent image is manifested using reflected light, the support to be used may be, but not limited to, a support having a reflective layer or a support having a reflection function as described later. When the latent image is manifested using transmitted light, the support to be used may be, but not limited to, a transparent support having optical properties not affecting the latent image. In this case, the retardation of the substrate may be 200 nm or less, preferably 100 nm or less, more preferably 50 nm or less.

As such a support, examples include plastic films such as cellulose ester (for example, cellulose acetate, cellulose propionate, and cellulose butyrate), polyolefin (for example, norbornene-based polymer), poly(meth)acrylate (for example, polymethylmethacrylate), polycarbonate, polyester, polysulfone, and norbornene-based polymer. The thickness of the support is preferably 3 µm to 500 µm, more preferably 10 µm to 200 µm, when the support is subjected to a continuous process such as a roll-to-roll process, although it may be selected, as needed, depending on the manufacturing mode.

The birefringent pattern member may have a drawn pattern that is visible without using any polarizing plate.

Further, the optically anisotropic layer may be formed so as to be embedded in the support. Since the optically anisotropic layer according to the invention has a high level of various types of resistance, it may also be formed on a film by a process including transferring the optically anisotropic layer onto an endless belt or a drum in a casting apparatus, casting a molten material for the support on the optically anisotropic layer, and forming them into a film by the desired process such as shaping, rolling or stretching similarly to the process of forming a general polymer film. Alternatively, the optically anisotropic layer may be sandwiched between two supports to form the member to be authenticated.

Resins having a melting temperature equal to or lower than the temperature at which the properties of the optically anisotropic layer are not degraded may be used for the member to be authenticated.

A stretching process can produce tearing properties and improve the openability. Therefore, taking the product form into account, various known processes may be added to the manufacturing process, because various mechanical properties can be expected to be imparted.

[Alignment Layer]

As described above, an alignment layer may be used for forming the optically anisotropic layer. The alignment layer may be generally formed on the surface of a support or a temporary support, or on the surface of an undercoating layer formed on the support or the temporary support. The alignment layer has function of controlling the alignment direction of liquid-crystalline compounds provided thereon, and, as far as it has such a function of providing the alignment to the optically anisotropic layer, may be selected from various known alignment layers. The alignment layer may be formed with reference to, for example, the descriptions in paragraphs [0094] to [0099] of JP-A-2008-281989.

[Reflective Layer]

A reflective layer or a support having a reflection function may be used in the member to be authenticated according to the present invention. The support having a reflection function refers to a material that has a reflection function by itself when used as a support, such as an aluminum foil. When the reflective layer or the support is observed from the patterned optically anisotropic layer side through a polarizing plate, the latent image based on the birefringent pattern can be visualized.

The reflective layer may be, but not limited to, a metal layer such as an aluminum or silver. Such a metal layer may be vapor-deposited on the support or the birefringent pattern builder, or metal foil stamping may be performed. The member to be authenticated having such a metal layer can improve the antistatic performance or the gas barrier properties and therefore is preferably used as a member to be authenticated of precision instrument packaging material or the like. Besides the metal layer, a support on which a print is made with gold or silver ink or the like may also be used. A complete mirror surface is not always necessary, and the surface may be matted.

Alternatively, a transparent member to be authenticated may be provided according to the invention, and a product (such as a box or a commercial product) having a glossy surface may be wrapped with the transparent member to be authenticated, so that the same effect as that of the reflective layer can be obtained.

[Post-Adhesive Layer]

The birefringent pattern builder may have a post-adhesive layer in order that the birefringent patterned member can be attached to another product.

[Two or More Optically Anisotropic Layers]

The birefringent pattern builder may have two or more optically anisotropic layers. The two or more optically anisotropic layers may be adjacent to each other in direction of the normal line, or may sandwich another functional layer. The two or more optically anisotropic layers may have almost the same retardation to each other, or different retardation from each other. The slow axes of them may be in the same direction to each other, or different direction from each other.

As an example wherein a birefringent pattern builder having two or more optically anisotropic layers laminated so that the slow axis of each is in the same direction is used, a case of preparing a pattern having large retardation can be mentioned. Even when the existing optically anisotropic layer cannot satisfy the desired retardation in a single layer, a patterned optically anisotropic layer including a region having a larger retardation or a complex retardation gradation can be easily obtained by forming a laminate of two or more layers and then subjecting the laminate to pattern exposure.

A birefringent pattern builder having two or more optically anisotropic layers laminated with their slow axes oriented in different directions may also be used. In this case, for example, latent images may be arranged to vary from one slow axis direction from another.

(Method of Producing Birefringent Pattern Builder)

The method of producing the birefringent pattern builder is not particularly limited. For example, the birefringent pattern builder may be produced by: directly forming an optically anisotropic layer on a support; forming a transferring material including the optically anisotropic layer and then transferring it onto another support; forming as a self-supporting optically anisotropic layer; forming another functional layer on a self-supporting optically anisotropic layer; attaching a support to a self-supporting optically anisotropic layer; or the like. Among these, in view of avoiding limitation to the property of the optically anisotropic layer, the method of direct formation of an optically anisotropic layer on a support and the method of forming a transferring material including the optically anisotropic layer and then transferring it onto another support are preferred. Further, in view of avoiding limitation to the support, the method of forming a transferring material including the optically anisotropic layer and then transferring it onto another support is more preferred.

As the method for producing the birefringent pattern builder having two or more optically anisotropic layers, the birefringent pattern builder may be produced by, for example, directly forming an optically anisotropic layer on a different birefringent pattern builder; transferring an optically anisotropic layer on a birefringent pattern builder by using a different birefringent pattern builder as a transferring material.

A birefringent pattern builder used as a transferring material will be explained in the followings. A birefringent pattern builder used as a transferring material may be referred to as "transferring material for producing a birefringent pattern" in the specification especially in the after-mentioned Examples.

[Temporary Support]

The birefringent pattern builder used as a transferring material is preferred to be formed on a temporary support. The temporary support is not particularly limited and may be transparent or opaque. Examples of the polymer, which can constitute a temporary support, include cellulose ester (for example, cellulose acetate, cellulose propionate, and cellulose butyrate), polyolefin (for example, norbornene-based polymer), poly(meth)acrylate (for example, polymethylmethacrylate), polycarbonate, polyester, polysulfone, and norbornene-based polymer. For the purpose of optical property examination in a manufacturing process, the support is preferably selected from transparent and low-birefringence polymer films. From the view point of low birefringence, cellulose ester and norbornene-based polymer are preferable. Examples of the low-birefringence polymer films include cellulose ester films and norbornene-based polymer films. Commercially available polymers such as a norbornene-based polymer, "ARTON" (trade name, manufactured by JSR Corporation) and "ZEONEX" and "ZEONOR" (trade names, manufactured by ZEON CORPORATION) may be used. Polycarbonate, polyethylene terephthalate, or the like which is inexpensive, may also be preferably used.

[Adhesive Layer for Transfer]

The transferring material may have an adhesive layer for transfer. The adhesive layer for transfer is not particularly limited as far as the layer is transparent and colorless, and has sufficient property for transfer. Examples include adhesive layer using an adhesive agent, a pressure-sensitive resin layer, a heat-sensitive resin layer, and a photo-sensitive resin layer. As the adhesive layer for transfer, for example, an adhesive agent, a pressure-sensitive resin layer, or a photo-sensitive resin layer may be used as described in paragraphs [0100] to [0119] of JP-A-2008-281989.

When polarized light passes through the adhesive layer for transfer in manifesting the latent image, the adhesive layer for transfer preferably has optical properties that do not affect the latent image as described in the section "Support." Specifically, it is preferably isotropic or preferably has a retardation that does not affect the manifestation of the latent image.

(Dynamic Property Control Layer)

Between the temporary support and the optically anisotropic layer of the transferring material, a dynamic property control layer to control mechanical characteristics and conformity to irregularity (concavity and convexity) may be preferably provided. As the dynamic property control layer, for example, those described in paragraph [0120] of JP-A-2008-281989 may be used.

[Intermediate Layer]

The transferring material preferably has an intermediate layer for the purpose of preventing mixing of the components during coating of a plurality of layers and during storage after the coating. The oxygen shut-off film having an oxygen shut-off function described as "separation layer" in JP-A-5-72724 or the above-described alignment layer for forming an optical anisotropy is preferably used as the intermediate layer. Among them, particularly preferably is a layer containing a mixture of polyvinylalcohol or polyvinylpyrrolidone and one or more derivatives thereof. A thermoplastic resin layer, oxygen shut-off layer, or alignment layer can be used also as the intermediate layer.

[Delamination Layer]

The birefringent pattern builder used as a transferring material may include a delamination layer on the temporary support. The delamination layer controls the adhesion between the temporary support and the delamination layer or between the delamination layer and the layer laminated immediately above, and takes a role of helping the separation of the temporary support after the transfer of the optically anisotropic layer. The above-mentioned other functional layers such as the alignment layer, the dynamic property control layer, and the intermediate layer may function as the delamination layer.

[Surface Protecting Layer]

A surface protecting layer having anti-fouling or hard-coating properties is preferably formed on the surface of the birefringent pattern member in order to protect the surface from fouling or damage. The properties of the surface protecting layer are not limited. The surface protecting layer may be produced using known materials and may be made of the same or similar material as the support (temporary support) or any other functional layer.

For example, the surface protecting layer may be an anti-fouling layer made of fluororesin such as polytetrafluoroethylene or a hard coat layer made of acrylic resin including polyfunctional acrylate. In addition, an anti-fouling layer may be placed on a hard coat layer, and the protecting layer may be placed on the optically anisotropic layer or any other functional layer.

[Other Functional Layers]

The functional layers described above may be used in combination with a variety of other functional layers such as: a functional layer that causes destruction or an optical property change to make it impossible to separate and reuse the birefringent pattern member; and a latent image layer that makes possible a combination with any other security technique such as a technique of manifesting a latent image with invisible light. Any other layer constituting the member to be authenticated may be constituted so as to have a retardation that does not affect the formation of the latent image or may be provided taking into account the retardation of those layers as mentioned above or the retardation value necessary for the formation of the latent image in the optically anisotropic layer.

The individual layers of the optically anisotropic layer, photosensitive resin layer, adhesive layer for transfer, and optionally-formed alignment layer, thermoplastic resin layer, dynamic property control layer, and intermediate layer can be formed by coating such as dip coating, air knife coating, spin coating, slit coating, curtain coating, roller coating, wire bar coating, gravure coating and extrusion coating (U.S. Pat. No. 2,681,294). Two or more layers may be coated simultaneously. Methods of simultaneous coating is described in U.S. Pat. Nos. 2,761,791, 2,941,898, 3,508,947, 3,526,528, and in "Kotingu Kogaku (Coating Engineering)", written by Yuji Harazaki, p. 253, published by Asakura Shoten (1973).

When the layer immediately above the optically anisotropic layer (for example, the adhesive layer for transfer) is applied to the optically anisotropic layer, the coating liquid may be added with a plasticizer or a photopolymerization initiator. Thereby, the modification of the optically anisotropic layer may be conducted simultaneously by penetration of these additives.

(Transferring Method of Transferring Material to Target Material of Transfer)

Methods of transferring the transferring material on a target material of transfer such as a support are not specifically limited, so far as the optically anisotropic layer can be transferred onto the target material of transfer. For example, the transferring material in a film form may be attached so that the surface of the adhesive layer for transfer is faced to the surface of the target material of transfer, then pressing under heating or no-heating with rollers or flat plates, which are heated and/or pressed by a laminator. Specific examples of the laminator and the method of lamination include those described in JP-A-7-110575, JP-A-11-77942, JP-A-2000-334836 and JP-A-2002-148794, wherein the method described in JP-A-7-110575 is preferable in terms of low contamination.

Examples of the target material of transfer include a support, a laminated structure containing a support and another functional layer, and a birefringent pattern builder.

(Steps Included in Transfer)

The temporary support may be separated or not be separated after the transfer of a birefringent pattern builder on the target material of transfer. When the temporary support is not separated, the temporary support preferably has transparency suited for the patterned light exposure afterwards and heat-resistance sufficient for enduring the baking step. A step for removing unwanted layers which has been transferred with the optically anisotropic layer may be included in the method. For example, when polyvinyl alcohol/polyvinylpyrrolidone copolymer is used in the alignment layer, the alignment layer and the layers above can be removed by development with an aqueous weak alkaline developing solution. Methods of the development may be any of known methods such as paddle development, shower development, shower-and-spin development and dipping development. The temperature of the developing solution is preferably 20° C. to 40° C., and pH of the developing solution is preferably 8 to 13.

Other layer may be formed on the surface remained after the separation of the temporary support or the removal of the unwanted layers, according to need. Another transferring material may be transferred on the surface remained after the separation of the temporary support or the removal of the unwanted layers, according to need. The transferring material may be the same as or different from the previously transferred transferring material. Further, the slow axis of the optically anisotropic layer in the first transferred transferring material may be in the same as or different direction from that of the slow axis of the optically anisotropic layer in the second transferred transferring material. As described above, transferring plural optically anisotropic layers is useful for production of a birefringent pattern having large retardation with plural optically anisotropic layers laminated so that the directions of the slow axes are the same, and a specific birefringent pattern with plural optically anisotropic layers laminated so that the directions of the slow axes are different from each other.

[Timing of Transfer]

When the transfer is conducted in the production of the birefringent pattern of the present invention, the timing of the transfer is arbitrary. Specifically, when the transfer is conducted in the production of a birefringent pattern including, for example, at least the following steps of in this order:

coating and drying a liquid containing a liquid-crystalline compound;

causing one kind of the reactive groups to react by applying heat or irradiating ionizing radiation;

conducting heat treatment or irradiation of ionizing radiation again to react reactive groups including reactive groups different from the one reacted in the above step; and causing an unreacted reactive group remaining in the optically anisotropic layer to react or deactivate (e.g., baking at a temperature of 50° C. or more and 400° C. or less), the transfer may be conducted immediately after the step of coating and drying a liquid containing a liquid-crystalline compound, after the step of causing one kind of the reactive groups to react by applying heat or irradiating ionizing radiation, or immediately before or after the step of causing the remaining unreacted reactive group to react or deactivate.

In this case, depending on the timing of the transfer, a material to be used may be limited. When the transfer is conducted immediately after the coating and drying, for example, the material must be made of a liquid-crystalline compound that can endure the transfer while being in an unreacted state. When the baking is conducted as the step of causing the remaining unreacted reactive group to react or deactivate and then the transfer is conducted, for example, a material to be used as a temporary support until the transfer must be a material that can endure the baking. From the viewpoint of enabling the use of materials in a wide range, the transfer is preferably conducted after the step of causing one kind of the reactive groups to react by applying heat or irradiating ionizing radiation.

[Timing of Pattern Formation]

In the production of the birefringent pattern of the present invention, the pattern-like heat treatment or irradiation of ionizing radiation may be conducted at any of the step of conducting heat treatment or irradiation of ionizing radiation. Specifically, for example, in the production of the birefringent pattern containing at least the following steps of in this order:

coating and drying a liquid containing a liquid-crystalline compound;

causing one kind of the reactive groups to react by applying heat or irradiating ionizing radiation; and conducting heat treatment or irradiation of ionizing radiation again to react reactive groups including reactive groups different from the one reacted in the above step, the step of causing one kind of the reactive groups to react by applying heat or irradiating ionizing radiation may be conducted in a patterned manner, the step of conducting heat treatment or irradiation of ionizing radiation again to react reactive groups including reactive groups different from the one reacted in the above step may be conducted in a patterned manner, or both of the steps also may be conducted in a patterned manner.

On the other hand, when the transfer is conducted in the production of the birefringent pattern, a material to be used may be limited depending on the timing at which the pattern-like heat treatment or irradiation of ionizing radiation is conducted. When the step of causing one kind of the reactive groups to react by applying heat or irradiating ionizing radiation is conducted in a patterned manner and the transfer is conducted immediately thereafter, for example, the material must be made of a liquid-crystalline compound that can endure the transfer while an unreacted region exists. From the viewpoint of enabling the use of materials in a wide range, when the transfer is conducted in the course of the production of the birefringent pattern, a not-pattern-like heat treatment or irradiation of ionizing radiation is preferably conducted prior to the transfer.

On the other hand, when it is desired that the transfer is followed by the formation of a pattern in accordance with the shape of the support or the base (ground) after the transfer, it is preferred that the step of causing one kind of the reactive groups to react by applying heat or irradiating ionizing radiation is firstly conducted in a not-patterned manner (overall) and then the transfer is conducted, after which the step of conducting heat treatment or irradiation of ionizing radiation again to react reactive groups including reactive groups different from the one reacted in the above step is conducted in a patterned manner. Such a case will be described below.

[Products Using the Birefringent Pattern Member]

The member to be authenticated of the invention obtained by subjecting the birefringent pattern builder to exposure and baking as described above is almost colorless and transparent under normal conditions. When it is placed between two polarizing plates or between a reflective layer and a polarizing plate, however, it shows distinctive light and dark patterns or desired colors caused by interference from the adjusted retardation, which is easy to visually recognize. Using this property, the member to be authenticated obtained by the above method can be used as, for example, a means for preventing forgery. That is, the member to be authenticated is normally almost invisible with the naked eye, whereas, through a polarizing plate, the patterned birefringent product can exhibit multi-colored image which can be readily identified. A copy of the birefringent pattern without any polarizing plate exhibits no image, whereas a copy through a polarizing plate exhibits a permanent pattern which is visible with the naked eye without any polarizing plate. Therefore, the reproduction of the birefringent pattern is difficult. Such kind of method of producing birefringent pattern is not widely spread, and needs unusual or special kind of material. Therefore, the patterned birefringent product can be considered to be favorably adapted as a means of preventing forgery.

Besides the forgery preventing means, applications may include information or image display media utilizing a latent image capable of showing elaborateness and/or multicolor.

Specific exemplary embodiments of the method of authenticating a birefringent pattern by using the viewer of the present invention are described below.

The viewer of the present invention is arranged on the birefringent pattern so as to be appropriately parallel to each other. At this time, the viewer may be laminated on the birefringent pattern. Alternatively, a space may be left between them within such a range that visibility of the birefringent pattern is not interfered by the space. In this state, the birefringent pattern is visually observed approximately from a normal direction.

Another preferable embodiment of the present invention is a kit for authenticating a birefringent pattern, the kit having at least two different viewers, at least one of the viewers being the viewer of the present invention. For example, the kit may be formed by setting right and left windows on a cardboard and attaching the viewer of the present invention to one or both of the windows. In this case, the kit is formed so that the viewer of the present invention is placed at the side of a member to be authenticated. Further, when one viewer is formed by the viewer of the present invention, the other viewer may be formed by the viewer of the present invention. Alternatively, a conventional polarizing plate may be used without modification as the other viewer. The use of the kit having at least two viewers makes it possible to authenticate various color patterns continuously, whereby authenticity can be determined more surely than by one viewer.

As the kit for authenticating a birefringent pattern according to the present invention, it is preferable that at least two viewers are different from each other in terms of optical axis and/or retardation of the optically anisotropic layer at the side of the member to be authenticated. For example, two viewers having a different optical axis from each other may be formed by attaching the two viewers to the above two windows so that an absorption axis direction of the polarizing plate of one viewer is different from an absorption axis direction of the polarizing plate of another viewer.

As mentioned above, at least two viewers are different from each other in terms of optical axis and/or retardation of the optically anisotropic layer at the side of the member to be authenticated, whereby the at least two viewers make it possible to visualize latent images having a different color from each other.

The number of the different viewers installed in the kit for authenticating a birefringent pattern is not particularly limited. The number is preferably from 2 to 4.

Another preferable embodiment of the present invention is an authenticity-verifying medium in which a viewer is integrated in a part of a member to be authenticated. Examples of the medium include a member to be authenticated, such as a gift certificate, in which the birefringent pattern is set in one region while the viewer of the present invention is set in the other region. In the viewer-integrated-type birefringent pattern as mentioned above, for example, a member to be authenticated is bended and a viewer is superposed on the birefringent pattern so that the optically anisotropic layer of the viewer is placed at the side of the birefringent pattern. In this manner, any one can determine, for example, authenticity of the member to be authenticated anywhere at any time.

Another preferable embodiment of the present invention is a method of verifying authenticity using the above-described viewer or kit for authenticating a birefringent pattern. For example, the viewer or the kit for authenticating a birefringent pattern is observed through the birefringent pattern so that a phase difference film is arranged at the side of the birefringent pattern. By observation in this manner, optical axis-patterned birefringent pattern looks multiple colors. Resultantly, authenticity can be authenticated and confirmed without such a complicated work as rotation of a polarizing plate. For example, when a latent image having at least three colors is confirmed by observing a member to be authenticated in which the above-described birefringent pattern has been formed in an authentic product, through the viewer or the kit, authenticity of the member to be authenticated can be identified as the authentic product.

The present invention provides a viewer that is able to authenticate easily and certainly a birefringent pattern that is used for a forgery-preventing label or the like.

The viewer of the present invention makes it possible to present a multicolor latent image of the birefringent pattern. Further, an optical axis-patterned latent image from an anterior view can also be identified as multiple colors. Therefore, it is possible to determine authenticity by a color of the latent image when the birefringent pattern is observed through the viewer without rotation of the viewer. Resultantly, the viewer of the present invention can shorten the time required to authenticate.

Accordingly, verification of authenticity that determines true/false of a member to be authenticated, such as a forgery-preventing label using a birefringent pattern or the like, can be performed with a certainty in an easy way by means of a viewer of the present invention or a kit using the same.

EXAMPLES

The present invention will be described in more detail based on the following examples. Any materials, reagents, amount and ratio of use and operations, as shown in the examples, may appropriately be modified without departing from the spirit and scope of the present invention. It is therefore understood that the present invention is by no means intended to be limited to the specific examples below.

In the following Examples, retardation is a value measured by irradiating a light having a wavelength of 550 nm in a direction normal to the film in KOBRA WR (trade name, Oji Scientific Instruments).

Reference Example 1

Production of Birefringent Pattern

Preparation of Coating Liquid AL-1 for Alignment Layer

The composition below was prepared, filtered through a polypropylene filter having a pore size of 30 μm, and the filtrate was used as coating liquid AL-1 for forming an alignment layer.

| Composition of Coating Liquid AL-1 for Alignment layer (mass %) | |
|---|---|
| Liquid crystal aligning agent (AL-1-1) | 1.0 |
| Tetrahydrofuran | 99.0 |

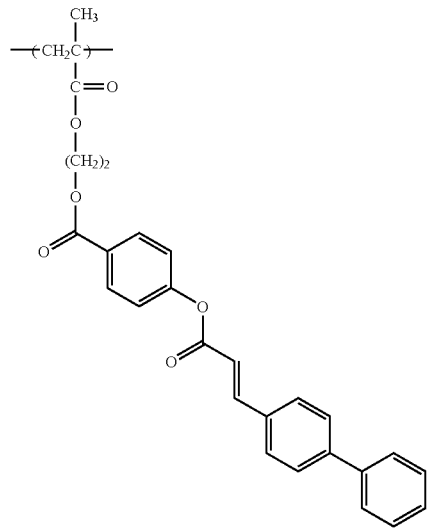

(AL-1-1)

(Preparation of Coating Liquid AL-2 for Alignment Layer)

The composition below was prepared, filtered through a polypropylene filter having a pore size of 30 μm, and the filtrate was used as coating liquid AL-2 for alignment layer.

| Composition of Coating Liquid AL-2 for Alignment layer (mass %) | |
|---|---|
| Polyvinyl alcohol (trade name: PVA205, manufactured by Kuraray Co., Ltd.) | 3.21 |
| Polyvinylpyrrolidone (trade name: Luvitec K30, manufactured by BASF) | 1.48 |
| Distilled water | 52.10 |
| Methanol | 43.21 |

(Preparation of Coating Liquid LC-1 for Optically Anisotropic Layer)

The composition below was prepared, filtered through a polypropylene filter having a pore size of 0.2 μm, and the filtrate was used as coating liquid LC-1 for optically anisotropic layer.

| Composition of Coating Liquid LC-1 for Optically Anisotropic Layer (mass %) | |
|---|---|
| Paliocolor LC242 (trade name, manufactured by BASF) | 31.53 |
| IRGACURE907 (trade name, manufactured by Chiba Speciality Chemicals Co., Ltd.) | 0.99 |
| KAYACURE DETX-S (trade name, manufactured by Nippon Kayaku Co., Ltd.) | 0.33 |
| Megafac F-176PF (trade name, manufactured by Dainippon Ink & Chemicals Incorporation) | 0.15 |
| Methyl ethyl ketone | 67.00 |

(Preparation of Coating Liquid LC-2 for Optically Anisotropic Layer)

The composition below was prepared, filtered through a polypropylene filter having a pore size of 0.2 μm, and the filtrate was used as coating liquid LC-2 for optically anisotropic layer.

LC-1-1 is a liquid-crystalline compound having two reactive groups, one of which is acrylic group, i.e. a radically reactive group, and the other of which is oxetanyl group, i.e. a cationically reactive group.

LC-1-2 is a disk-shaped compound added for the purpose of alignment control. LC-1-2 was synthesized according to the method described in Tetrahedron Lett., Vol. 43, p. 6793 (2002).

| Composition of Coating Liquid LC-2 for Optically Anisotropic Layer (mass %) | |
|---|---|
| Rod-like liquid crystal (LC-1-1) | 32.59 |
| Horizontal alignment agent (LC-1-2) | 0.02 |
| Cationic photopolymerization initiator (trade name: CPI100-P, manufactured by SAN-APRO Co., Ltd.) | 0.66 |

| Composition of Coating Liquid LC-2 for Optically Anisotropic Layer (mass %) | |
|---|---|
| Polymerization control agent (trade name: IRGANOX1076, manufactured by Chiba Speciality Chemicals Co., Ltd.) | 0.07 |
| Methyl ethyl ketone | 66.66 |

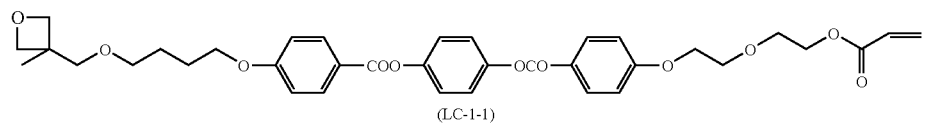

(LC-1-1)

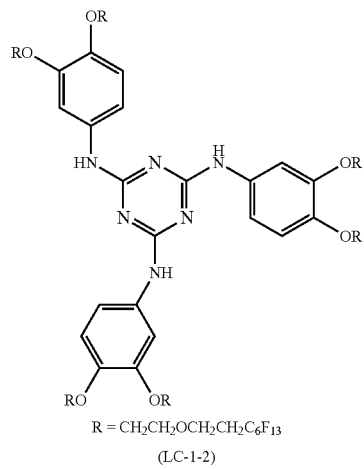

R = CH$_2$CH$_2$OCH$_2$CH$_2$C$_6$F$_{13}$ (LC-1-2)

(Preparation of Coating Liquid PL-1 for Protective Layer)

The composition below was prepared, filtered through a polypropylene filter having a pore size of 0.2 μm, and the filtrate was used as coating liquid PL-1 for protective layer.

| Composition of Coating Liquid PL-1 for Protective Layer (mass %) | |
|---|---|
| Random Copolymer of benzyl methacrylate, methacrylic acid and methylmethacrylate, having a molar ratio of 35.9/22.4/41.7, a weight-average molecular weight of 38,000 | 8.05 |
| KAYARAD DPHA (trade name, manufactured by Nippon Kayaku Co., Ltd.) | 4.83 |
| Radical polymerization initiator (2-trichloromethyl-5-(p-styrylstyryl)-1,3,4-oxadiazole | 0.12 |
| Hydroquinone monomethyl ether | 0.002 |
| Megafac F-176PF (trade name, manufactured by Dainippon Ink & Chemicals Incorporation) | 0.05 |
| Propylene glycol monomethyl ether acetate | 34.80 |
| Methyl ethyl ketone | 50.538 |
| Methanol | 1.61 |

(Photomask for Pattern Exposure)

Figure 4:
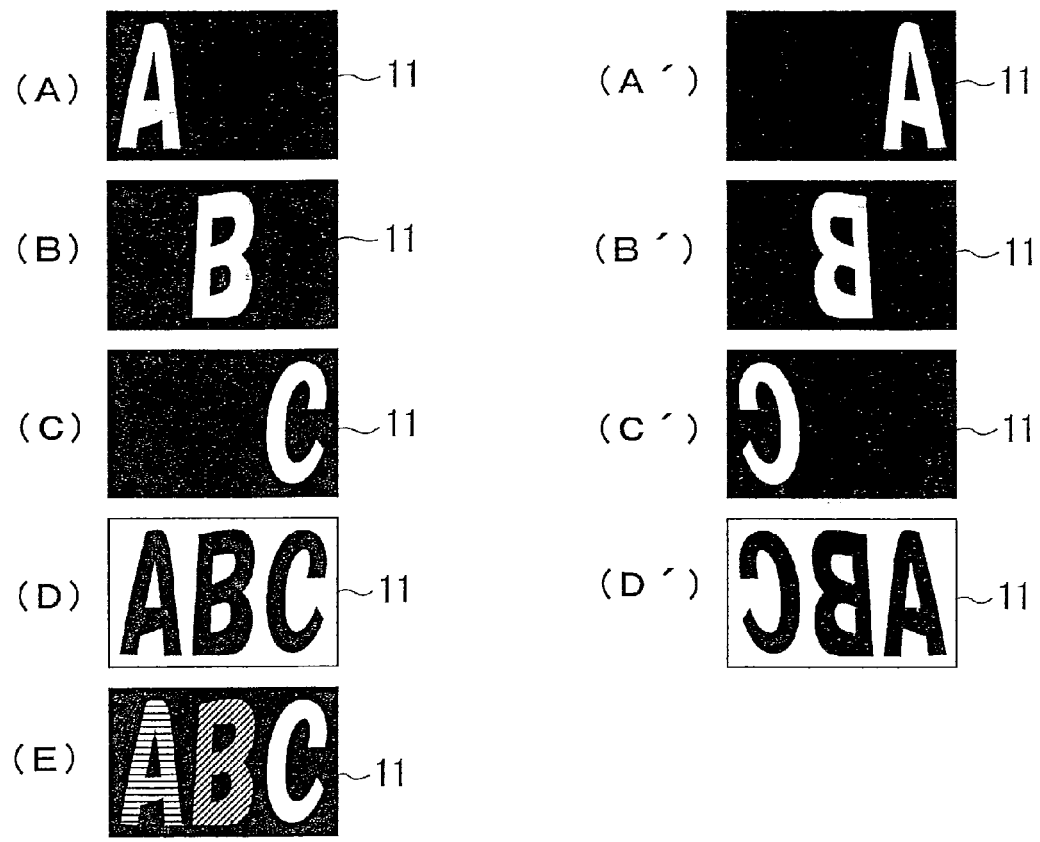
FIG. 4 is a plane view showing the shape of the photomask used in Examples.

Photomask 11 shown in plane views of FIGS. 4(A) to (E), and (A') to (D') was used in the Examples. FIG. 4(A) shows photomask A, FIG. 4(B) shows photomask B, FIG. 4(C) shows photomask C, FIG. 4(D) shows photomask D, FIG. 4(E) shows photomask E, FIG. 4 (A') shows photomask A', FIG. 4 (B') shows photomask B', FIG. 4 (C') shows photomask C', and FIG. 4 (D') shows photomask D', respectively. Each photomask is an emulsion mask having thickness of 2.1 mm and a quartz glass as a base material. In FIGS. 4(A) to (D), and (A') to (D'), transmittance at a wavelength of 365 nm of the blackened region is 0%, while transmittance at a wavelength of 365 nm of the white region is 92%.

Photomask E is a mask of concentration consisting of four regions of Alphabet "A", Alphabet "B", Alphabet "C", and a background. Transmittance of ultraviolet light having λ=365 nm in each region is shown in Table A.

TABLE A

| region | transmittance |
|---|---|
| Alphabet "A" | 20% |
| Alphabet "B" | 33% |
| Alphabet "C" | 92% |
| background | 0% |

(Production of Birefringent Pattern BP-1)

Aluminum layer with a thickness of 60 nm was deposited on a 50 μm-thick-polyethylene terephthalate film (LUMIRROR L-25T60 (trade name), manufactured by Toray Industries, Inc.). After that, coating liquid AL-1 for alignment layer was coated on the aluminum using a wire bar, and dried. The dry film thickness was 0.1 μm.

Photomask A was arranged on the organic film obtained above, and then an ultraviolet light exited from an ultraviolet light irradiator (EXECURE 3000, manufactured by HOYA CANDEO OPTRONICS CORPORATION) was irradiated from a perpendicular direction with respect to the support via a linear polarizing plate (linearly polarizing plate) at an intensity of 100 mW/cm$^2$ (365 nm) for 1 second. At this time, the polarizing plate was arranged so that the azimuth angle of absorption axis of the linear polarizing plate was 0° with respect to the long side of the photomask.

Subsequently, the photomask was changed to photomask B, photomask C and photomask D in this order, respectively. The polarizing plate was arranged so that the absorption axis of the linear polarizing plate was in the direction of 45°, 90°, and 135° with respect to the long side of the photomask, respectively. Under this condition, an ultraviolet light was irradiated in the same manner as described above.

Figure 5:
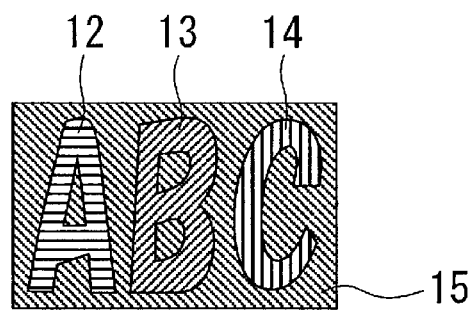
FIG. 5 is a plane view of the birefringent pattern in Examples.

After that, coating liquid LC-1 for optically anisotropic layer was coated on the linear polarizing plate using a wire bar, and then dried at a film surface temperature of 105° C. for 2 minutes to form a liquid-crystalline phase state. Then, an ultraviolet light was irradiated under the conditions of illuminance of 400 mW/cm² and irradiance of 400 mJ/cm² in an atmosphere of air using an air-cooled metal halide lamp (manufactured by EYE GRAPHICS CO., LTD.) of 160 mW/cm². Resultantly, an alignment state of the liquid-crystalline phase was fixed to form a 0.9 µm-thick optically anisotropic layer, thereby producing BP-1 having a pattern as shown in the plane view of FIG. 5.

The retardation phase axis of each of alphabet A 12, alphabet B 13, alphabet C 14 and background 15 of the BP-1 was 0°, 45°, 90°, and 135° with respect to the long side of the BP-1, respectively. The retardations of these regions were all 135 nm (λ/4).

(Production of Birefringent Pattern Builder TR-1)

To the surface of a temporary support formed of a 100-µm-thick polyethylene terephthalate film with easily adhesivable property (COSMOSHINE A4100 (trade name), manufactured by Toyobo Co., Ltd.), the coating liquid AL-2 for alignment layer in this order was applied by using a wire bar coater and dried. The obtained layer had a dry film thickness of 0.5 µm. An aligned layer was then formed by rubbing in the MD direction, and coating liquid LC-2 for optically anisotropic layer was applied thereto with a wire bar. The coating was dried at a coating surface temperature of 105° C. for 2 minutes to form a liquid-crystalline phase. The coated layer was then irradiated in the air atmosphere by ultraviolet radiation by using a 160 mW/cm², air-cooled metal halide lamp (manufactured by EYE GRAPHICS CO., LTD.), so as to fix the alignment state of the phase to thereby obtain a 3.1-µm-thick optically anisotropic layer. In this manner, a sample TRC-1 coated with the optically anisotropic layer was prepared. The ultraviolet light used was 100 mW/cm² illuminance in the range of UV-A (integrated value in the wavelength between 320 nm and 400 nm), and 80 mJ/cm² irradiance level in the range of UV-A. The optically anisotropic layer was a solid polymer at 20° C. and exhibited MEK (methyl ethyl ketone) resistance.

After that, coating liquid PL-1 for protective layer was coated on the optically anisotropic layer, and then dried to form a 1.2 µm-thick-protective layer, thereby producing transfer material TR-1 for forming a birefringent pattern.

(Production of Transferring Birefringent Pattern Builder TR-A, B, C, and D)

The size of photomasks A', B', C' and D' is identical to each other. Four pieces of the same size as the photomask were cut off from TR-1. At this time, the first sheet was cut off so that the long side of the piece was the same as the MD direction. Likewise, the second piece, the third piece and the forth piece were each cut off so that the long side of each of these pieces was inclined at 135°, 90°, and 45° from the MD direction, respectively.

Similarly, transferring birefringent pattern builder TR-B, TR-C, and TR-D were produced by using photomasks B', C' and D' respectively on each of a piece of TR-1 that was cut off so that the long side of the piece was inclined at 135° from the MD direction, a piece of TR-1 that was cut off so that the long side of the sheet was inclined at 90° from the MD direction, and a piece of TR-1 that was cut off so that the long side of the piece was inclined at 45° from the MD direction, and by exposing to each of these composites. Photomask A' was laminated on the piece of TR-1 that was cut off so that the long side of the piece was the same as the MD direction. To this composite, a light having a peak wavelength at 365 nm was irradiated using M-3L mask analyzer manufactured by MIKASA CO., LTD at exposure intensity of 6.25 mW/cm² for 10 seconds, thereby producing transferring birefringent pattern builder TR-A for birefringent pattern.

Similarly, transferring birefringent pattern builders TR-B, TR-C, and TR-D were produced by using photomasks B', C' and D' respectively on each of a piece of TR-1 that was cut off so that the long side of the piece was inclined at 135° from the MD direction, a piece of TR-1 that was cut off so that the long side of the piece was inclined at 90° from the MD direction, and a piece of TR-1 that was cut off so that the long side of the piece was inclined at 45° from the MD direction, and by exposing to each of these composites.

(Production of Birefringent Pattern BP-2)

A 25-µm-thick-polyimide film (KAPTON 200H, manufactured by DU PONT-TORAY CO., LTD) having deposited aluminum of 60 nm thereon was prepared. Transferring birefringent pattern builder TR-A was laminated on the aluminum-deposited surface of the polyimide film that was heated at 100° C. for 2 minutes, under the conditions of rubber roller temperature 130° C. and linear pressure 100 N/cm and transportation velocity 1.4 m/minute, using a laminator (LAMIC II, manufactured by Hitachi Industries Co., Ltd. Hitachi Industries Co., Ltd., presently Hitachi Plant Technologies, Ltd.). After lamination, the temporary support was separated from the laminate. On the resultant material, transferring birefringent pattern builders TR-B, TR-C, and TR-D were laminated in the same manner as described above.

After that, the resultant laminate was baked in a clean oven of 200° C. for 30 minutes, whereby birefringent pattern BP-2 having the same pattern as shown in the plane view of Table 5 was produced.

The retardation phase axis of each of alphabet A 12, alphabet B 13, alphabet C 14 and background 15 of the BP-2 was 0°, 45°, 90°, and 135° with respect to the long side of the BP-2, respectively. The retardations of these regions were all 270 nm (λ/2).

(Production of Birefringent Pattern BP-3)

Birefringent pattern BP-3 having the same pattern as shown in the plane view of Table 5 was produced in the same manner as the birefringent pattern BP-1, except that the support was changed to a 50 µm-thick-sandblasted polyethylene terephthalate film (LUMIRROR L-25T60 (trade name), manufactured by Toray Industries, Inc.) having deposited aluminum of 60 nm thereon, and further the film thickness of the optically anisotropic layer was changed to 2.8 µm.

The retardation phase axis of each of alphabet A 12, alphabet B 13, alphabet C 14 and background 15 of the BP-3 was 0°, 45°, 90°, and 135° with respect to the long side of the BP-3, respectively. The retardations of these regions were all 420 nm (3λ/4).

(Production of Birefringent Pattern BP-4)

A 50 µm-thick-polyimide film (KAPTON 200H, manufactured by DU PONT-TORAY CO., LTD) having deposited aluminum of 60 nm thereon was prepared. Subsequently, on the aluminum, coating liquid AL-2 for forming alignment layer was coated in this order using a wire bar, and dried. The dry film thickness was 0.5 µm. After rubbing the alignment layer in the MD direction, coating liquid LC-2 for optically anisotropic layer was coated using a wire bar, and dried at a film surface temperature of 105° C. for 2 minutes to form a liquid-crystalline state. After that, an ultraviolet light was irradiated to the optically anisotropic layer in an air using an air-cooled metal halide lamp of 160 mW/cm² (manufactured by EYE GRAPHICS CO., LTD.), whereby the alignment state was fixed. As a result, a 3.5 µm-thick-optically anisotropic layer was formed, thereby producing an optically anisotropic layer-coating sample TRC-2. At this time, the illuminance of the used ultraviolet light in the UV-A range (integrated value of wavelength ranging from 320 nm to 400 nm) was 100 mW/cm² and the irradiance level in the UV-A range was 80 mJ/cm². The optically anisotropic layer was a solid polymer at 20° C. and exhibited MEK (methyl ethyl ketone) resistance.

After that, coating liquid PL-1 for protective layer was coated on the optically anisotropic layer and dried to prepare a 1.2 µm-thick-protective layer. The resultant film was exposed using M-3L mask analyzer manufactured by MIKASA CO., LTD. and a photomask E at exposure illuminance of 6.25 mW/cm² for 8.2 seconds. At this time, the film was arranged so that the MD direction of the film was 45° with respect to the horizontal axis of the photomask.

Then, the exposed film was baked in an oven at 200° C. for 30 minutes. At the end, birefringent pattern BP-4 having the same pattern as shown in the plane view of FIG. 5 was produced after performing a regular print.

The retardation of each of alphabet A 12, alphabet B 13, alphabet C 14 and background 15 of the BP-4 was 143 nm, 202 nm, 297 nm, and 3 nm, respectively. The retardation phase axes of these regions were all the direction of 45°.

Comparative Example 1

Viewer 1

Figure 6:
FIG. 6 is a schematic cross-sectional view of the viewer in Comparative Example 1.

Polarizing plate 21 (Super High Contrast linearly polarizing plate, manufactured by SANRITZ CORPORATION) shown in the schematic cross-sectional view of FIG. 6 was designated as viewer 1. The phase difference (retardation) of viewer 1 was 0.

Example 1

Viewer 2

To the surface of a 80-μm-thick triacetylcellulose film (Fuji Tac TD80, manufactured by Fuji Photo Film Co., Ltd.), coating liquid AL-2 for alignment layer was applied by using a wire bar coater and dried. The obtained layer had a dry film thickness of 0.5 μm. An aligned layer was then formed by rubbing in the MD direction, and coating liquid LC-1 for optically anisotropic layer was applied thereto with a wire bar. The coating was dried at a coating surface temperature of 105° C. for 2 minutes to form a liquid-crystalline phase. The coated layer was then irradiated in the air atmosphere by ultraviolet radiation by using a 160 mW/cm², air-cooled metal halide lamp (manufactured by EYE GRAPHICS CO., LTD.), so as to fix the alignment state to thereby obtain a 0,9-μm-thick optically anisotropic layer.

The retardation phase axis of the phase difference film was in the MD direction. The retardation was 135 nm (λ/4).

Figure 7:
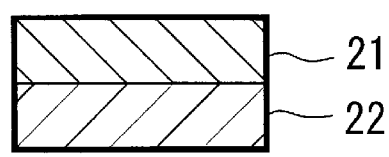
FIG. 7 is a schematic cross-sectional view of the viewer in Example 1.

As shown in the schematic cross-sectional view of FIG. 7, phase difference film 22 was attached on Super High Contrast linearly polarizing plate 21 (manufactured by SANRITZ CORPORATION) using an adhesive in such a manner that the retardation phase axis of the phase difference film 22 was rotated 45 degrees in anticlockwise direction from the absorption axis of the polarizing plate. The resultant product was designated as viewer 2.

Example 2

Viewer 3

Figure 8:
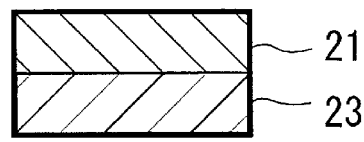
FIG. 8 is a schematic cross-sectional view of the viewer in Example 2.

As shown in the schematic cross-sectional view of FIG. 8, uniaxially-stretched film 23 was attached on Super High Contrast linearly, polarizing plate 21 (manufactured by SANRITZ CORPORATION) using an adhesive in such a manner that the retardation phase axis of the uniaxially-stretched film 23 was rotated 45 degrees in anticlockwise direction from the absorption axis of the polarizing plate. The resultant product was designated as viewer 3.

Example 3

Viewer 4

Viewer 4 was produced in the same manner as viewer 2, except that the film thickness of the optically anisotropic layer was changed to 2.8 μm. At this time, the retardation of the phase difference film was 420 nm (3λ/4).

Example 4

Kit 1 for Authenticating Birefringent Pattern

Figure 9:
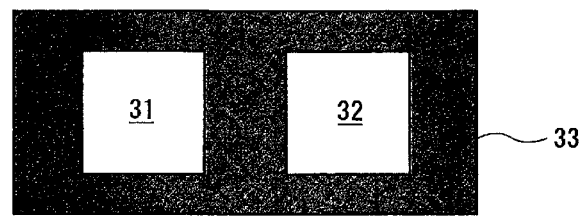
FIG. 9 is a plane view of the kit for authenticating a birefringent pattern in Example 4.

As shown in the plane view of FIG. 9, 4-by-7.5 centimeter paper board 33 (OK BOURU (trade name), manufactured by Oji Paper Co., Ltd., 310 g/m²) having 2×2 centimeter windows 31 and 32 made in the paper board was prepared. Viewer 3 of Example 2 shown in FIG. 8 was put on window 31 at the left side of the paper board in such a manner that the uniaxially-stretched film 23 was the bottom and the absorption axis of polarizing plate 21 was in the direction of 90° with respect to the long side of the paper board 33. On window 32 at the right side of the paper board, viewer 3 was put in such a manner that the uniaxially-stretched film 23 was the bottom and the absorption axis of polarizing plate 21 was in the direction of 45° with respect to the long side of paper board 33. In this way, kit 1 for authenticating a birefringent pattern was obtained.

Example 5

Kit 2 for Authenticating Birefringent Pattern

In the same manner as in Example 4,4-by-7.5 centimeter paper board 33 having 2×2 centimeter windows 31 and 32 made in the paper board was prepared. Viewer 3 of Example 2 shown in FIG. 8 was put on window 31 at the left side of the paper board in such a manner that uniaxially-stretched film 23 was the bottom and the absorption axis of polarizing plate 21 was in the direction of 90° with respect to the long side of paper board 33. On window 32 at the right side of the paper board, viewer 1 was put in such a manner that the absorption axis of polarizing plate 21 was in the direction of 90° with respect to the long side of paper board 33.

Test Example 1

The birefringent pattern BP-1, which looks like a reflective silver color film when viewed with the ordinary naked eye, was observed through the viewer 1 of Comparative Example 1 so as to have a configuration that the absorption axis of the viewer 1 was in the direction of 90° with respect to the long side of the birefringent pattern BP-1. As a result, alphabets "A" and "C" looked bright, whereas the other portion looked dark. When the viewer 1 was rotated 45°, light and dark were reversed. Rotation of the polarizing plate makes it possible to determine authenticity. However, when a lot of authenticity determination is demanded, it is not effective to use the viewer 1 of Comparative Example 1.

Test Example 2

The birefringent pattern BP-2, which looks like a reflective silver color film when viewed with the ordinary naked eye, was observed through the viewer 1 of Comparative Example. As a result, alphabets "A" and "C" looked bright, whereas the other portion looked green. When the viewer 1 was rotated 45°, light and green were reversed. Rotation of the polarizing plate makes it possible to determine authenticity. However, when a lot of authenticity determination is demanded, it is not effective to use the viewer 1 of Comparative Example 1.

Test Example 3

The birefringent pattern BP-3 was observed through the viewer 1 of Comparative Example 1. As a result, alphabets "A" and "C" looked bright, whereas the other portion looked violet. When the viewer 1 was rotated 45°, light and violet were reversed. Rotation of the polarizing plate makes it possible to determine authenticity. However, when a lot of authenticity determination is demanded, it is not effective to use the viewer 1 of Comparative Example 1.

Test Example 4

The birefringent pattern BP-1 was observed through the viewer 2 of Example 1. At this time, the phase difference film was arranged at the side of the birefringent pattern BP-1. As a result, alphabets "A" and "C" looked light green; and alphabet "B" looked green; and the background looked gray. In this way, a pattern constituted by three colors was observed with the naked eye.

Test Example 5

The birefringent pattern BP-1 was observed through the viewer 3 of Example 2. At this time, the phase difference film is arranged at the side of the birefringent pattern BP-1. As a result, alphabets "A" and "C" looked light gray; and alphabet "B" looked violet; and the background looked dark blue. In this way, a pattern constituted by three colors was observed clearly with the naked eye.

Test Example 6

The birefringent pattern BP-2 was observed through the viewer 3 of Example 2. At this time, the phase difference film is arranged at the side of the birefringent pattern BP-2. As a result, alphabets "A" and "C" looked light yellowish green; and alphabet "B" looked green; and the background looked gray. In this way, a pattern constituted by three colors was observed with the naked eye.

Test Example 7

The birefringent pattern BP-3 was observed through the viewer 3. At this time, the phase difference film is arranged at the side of the birefringent pattern BP-3. As a result, alphabets "A" and "C" looked light yellowish green; and alphabet "B" looked green; and the background looked gray. In this way, a pattern constituted by three colors was observed clearly with the naked eye.

Test Example 8

The birefringent pattern BP-1 was observed through the viewer 4. At this time, the phase difference film is arranged at the side of the birefringent pattern BP-1. As a result, alphabets "A" and "C" looked gray; and alphabet "B" looked green; and the background looked yellowish green. In this way, a pattern constituted by three colors was observed with the naked eye.

The results of Test Examples 1 to 8 are collectively shown in Table 1.

TABLE 1

| No. | birefringent pattern BP | phase difference of birefringent pattern | viewer | phase difference of viewer | identification |
|---|---|---|---|---|---|
| 1 | 1 | $\lambda/4$ | 1 | 0 | C |
| 2 | 2 | $\lambda/2$ | 1 | 0 | C |
| 3 | 3 | $3\lambda/4$ | 1 | 0 | C |
| 4 | 1 | $\lambda/4$ | 2 | $\lambda/4$ | B |
| 5 | 1 | $\lambda/4$ | 3 | $\lambda/2$ | A |
| 6 | 2 | $\lambda/2$ | 3 | $\lambda/2$ | B |
| 7 | 3 | $3\lambda/4$ | 3 | $\lambda/2$ | A |
| 8 | 1 | $\lambda/4$ | 4 | $3\lambda/4$ | B |

(Herein, phase difference of birefringent pattern and phase difference of viewer mean front retardation of birefringent pattern and front retardation of optically anisotropic layer of viewer respectively.)

In Table 1, the mark "C" with respect to evaluation of identification means that since a latent image is formed of two colors, a degree of identification is low. In contrast, the mark "B" means that since a latent image is formed of three colors, a degree of identification is high, but two of the three colors have a similar hue to each other. Further, the mark "A" means that since a latent image is formed of three colors which have a different hue from each other, identification is very excellent.

As shown in Table 1, the viewer 1 of Comparative Example 1 is able to visually distinguish no more than two color pattern, so that authenticity can not be determined unless the viewer is rotated. In contrast, when the viewers 2 to 4 of Examples 1 to 3 are used, a pattern constituted by three colors can be visually distinguished so that authenticity can be determined without rotation of a polarizing plate. Especially, when the viewer 3 is used, visual discrimination is further improved because the hue of three colors is significantly different from each other.

Test Example 9

BP-1 was observed using a kit 1 for authenticating a birefringent pattern of Example 4. When observed through a viewer at the left side, gray alphabets "A" and "C", and violet alphabet "B" were observed in the dark blue background. Further, when observed through a viewer at the right side, violet alphabet "A" and dark blue alphabet "C" were observed in the transparent background.

Test Example 10

BP-1 was observed using a kit 2 for authenticating a birefringent pattern of Example 5. When observed through a viewer at the left side, gray alphabets "A" and "C", and violet alphabet "B" were observed in the dark blue background. Further, when observed through a viewer at the right side, gray alphabets "A" and "C" were observed in the dark blue background.

As shown in Test Examples 9 and 10, the use of a kit having two or more viewers makes it possible to determine authenticity more surely.

Test Example 11

The birefringent pattern BP-4, which looks like a printed and reflective silver color film when viewed with the ordinary naked eye, was observed through the viewer 1 of Comparative Example 1 so as to have a configuration that the absorption axis of the viewer 1 was in the direction of 90° with respect to the long side of BP-4. As a result, alphabets "A", "B", "C" and the background looked dark blue, yellowish green, yellow and gray, respectively.

Test Example 12

The birefringent pattern BP-4 was observed in the same manner as in Example 11, except that viewer 2 of Example 1 was used as a viewer. As a result, the color of each region of the alphabets "A", "B" and "C" and background was changed to yellowish green, orange, violet and dark blue, respectively.

Test Example 13

The birefringent pattern BP-4 was observed in the same manner as in Example 11, except that viewer 3 of Example 2 was used as a viewer. As a result, the color of each region of the alphabets "A", "B" and "C" and background was changed to violet, blue green, yellow and green, respectively.

As shown in Test Examples 11 to 13, observation though viewer 1 still exhibits some degree of identification, the use of viewer 2 or 3 makes it possible to represent more riot of color. As a result, identification was more improved.

Example 6

Viewer-Integrated-Type Birefringent Pattern

Figure 10:
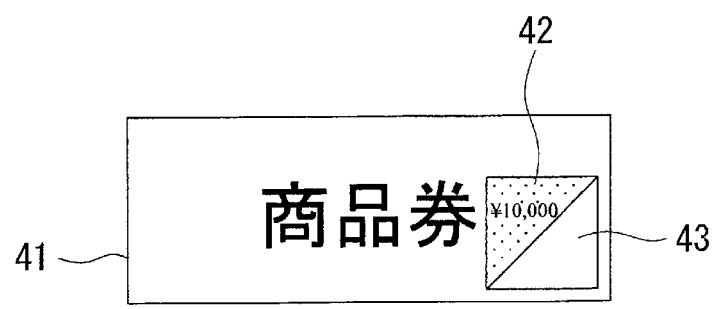
FIG. 10 is a plane view of the viewer-integrated-type birefringent pattern in Example 6.

As shown in the plane view of FIG. 10, information was printed on paper board 41. The background of the region indicated by 42 in the figure is printed with a silver ink, while the portion of money "¥10,000" is printed with a red ink.

After that, coating liquid AL-1 for alignment layer was coated on region 42 and then dried. On the thus-coated alignment layer, photomask 44 (quartz glass emulsion mask having the character "genuine" as a transmission region) shown in the plane view of FIG. 11(a) was set. Then, an ultraviolet light exited from an ultraviolet light irradiator (EXECURE 3000, manufactured by HOYA CANDEO OPTRONICS CORPORATION) was irradiated to the photomask via a linear polarizing plate from a perpendicular direction with respect to the support at an intensity of 100 mW/cm$^2$ (365 nm) for 1 second. At this time, the polarizing plate was arranged so that the azimuth angle of absorption axis of the linear polarizing plate was 45° with respect to the long side of paper board 41.

Figure 11:
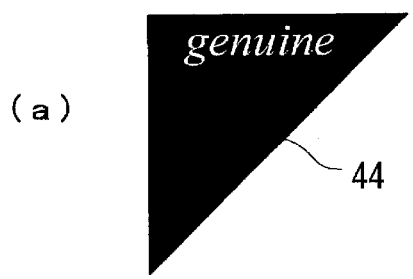
FIG. 11 is a plane view showing the shape of the photomask used in Example 6.
Figure 11:
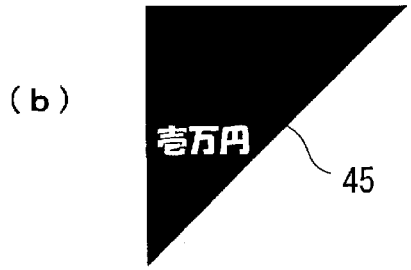
Figure 11:
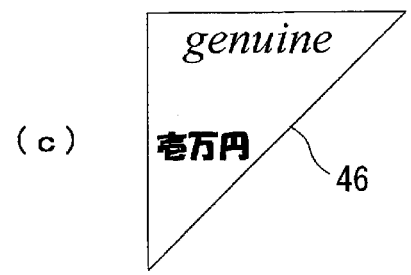

Subsequently, the photomask was changed to photomask 45 (quartz glass emulsion mask having the character "10,000 yens" (in English) as a transmission region) shown in the plane view of FIG. 11(b) and photomask 46 (quartz glass emulsion mask having the characters "genuine" and "10,000 yens" (in English) as a transmission region) shown in the plane view of FIG. 11(c) in this order. Further, a linearly polarizing plate was arranged so that each absorption axis of the polarizing plate was 90° and 135° with respect to the long side of paper board 41, respectively. Thereafter, irradiation of ultraviolet light was performed in the same manner as described above. The planar shape of each of photomasks 44-46 is almost the same as the external shape of region 42.

Further, a coating liquid LC-1 for optically anisotropic layer was coated on the linear polarizing plate, and then dried at a film surface temperature of 105° C. for 2 minutes to form a liquid-crystalline phase state. Then, an ultraviolet light was irradiated under the conditions of illuminance of 400 mW/cm$^2$ and irradiance of 400 mJ/cm$^2$ in an atmosphere of air using an air-cooled metal halide lamp (manufactured by EYE GRAPHICS CO., LTD.) of 160 mW/cm$^2$. Resultantly, an alignment state of the liquid-crystalline phase was fixed to form a 0.9 μm-thick-optically anisotropic layer.

The retardation phase axis of each of the character "genuine", the character "10,000 yens" (in English) and the background of the patterned form obtained above was 45°, 90° and 135° with respect to the long side of paper board 41, respectively. These regions showed all 135 nm retardation.

Thereafter, region 43 shown in FIG. 10 was stamped out. Viewer 3 of Example 2 shown in FIG. 8 was put on the portion so that a uniaxially-stretched film was arranged at the front side and an absorption axis of the polarizing plate faced the direction of 90°. In this way, the viewer-integrated type birefringent pattern BP-5 was produced.

Test Example 14

When viewed with the ordinary naked eye, region 42 of the gift card shown in FIG. 10 looks like "10,000 yens" described in red on a silver-colored background print. However, when the bottom-right portion of the gift card was pinched to superimpose the portion of window, namely region 43 on region 42, character "genuine" in violet color came above "¥10,000", and character "10,000 yens" (in English) in gray color came under "10,000 yens". At this time, the portion of the background was in dark blue. In the viewer-integrated-type birefringent pattern BP-5, any one can determine authenticity of the gift card anywhere at any time, without preparing a viewer separately because a viewer is embedded with a gift card.

Having described our invention as related to the present embodiments, it is our intention that the present invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2009-126829 filed in Japan on May 26, 2009, which is entirely herein incorporated by reference.

What is claimed is:

1. A viewer for authenticating a birefringent pattern having at least two regions having a different birefringence from each other, wherein the viewer comprises a polarizing plate and at least one optically anisotropic layer laminated on the polarizing plate, a front retardation of the at least one optically anisotropic layer is 5 nm or more and the total of the front retardation of the at least one optically anisotropic layer and a maximum value of front retardation of the birefringent pattern is greater than λ/2, wherein λ represents a wave length of incident light from a direction normal to the birefringent pattern and the optically anisotropic layer in nm, and wherein the viewer identifies a birefringent pattern that is formed in terms of a direction of an optical axis.

2. The viewer according to claim 1, wherein the front retardation of the birefringent pattern is in the range of (n1/2+1/8)λ to (n1/2+3/8)λ, in which n1 represents 0 or an integer greater than 0.

3. The viewer according to claim 1, wherein the front retardation of the at least one optically anisotropic layer of the viewer is in the range of (n2/2−1/8)λ to (n2/2+1/8) in which n2 represents a natural number.

4. A kit for authenticating a birefringent pattern, wherein the kit comprises at least two viewers, at least one of the viewers being the viewer according to claim 1.

5. The kit for authenticating a birefringent pattern according to claim 4, wherein the at least two viewers are different from each other in terms of at least one of optical axes and/or a retardation of an optically anisotropic layer arranged at the side of a member to be authenticated.

6. An authenticity-verifying medium comprising the viewer according to claim 1 in a part of a member to be authenticated.

7. A method of verifying authenticity which comprises observing a member to be authenticated through the viewer according to claim 1.

8. A method of verifying authenticity which comprise observing a member to be authenticated through the kit for authenticating a birefringent pattern according to claim 4.

9. The method of verifying authenticity according to claim 7, comprising:
- observing a member to be authenticated in which the birefringent pattern is formed in an authentic product through the viewer, and
- confirming a latent image composed of at least three colors, thereby verifying authenticity of the member to be authenticated.

10. The method of verifying authenticity according to claim 8, comprising:
- observing a member to be authenticated in which the birefringent pattern is formed in an authentic product through the kit for authenticating a birefringent pattern, and
- confirming a latent image composed of at least three colors, thereby verifying authenticity of the member to be authenticated.

11. An authenticity-verifying medium, comprising: a birefringent pattern having at least two regions having a different birefringence from each other; and a viewer of claim 1 for authenticating the birefringent pattern.

12. The authenticity-verifying medium according to claim 11, wherein the front retardation of the birefringent pattern is in the range of $(n_1/2+1/8)\lambda$ to $(n_1/2+3/8)\lambda$, in which $n_1$ represents 0 or an integer greater than 0.

13. The authenticity-verifying medium according to claim 11, wherein the front retardation of the at least one optically anisotropic layer of the viewer is in the range of $(n_2/2-1/8)\lambda$ to $(n_2/2+1/8)\lambda$, in which $n_2$ represents a natural number.

14. The authenticity-verifying medium according to claim 11, wherein the viewer for authenticating a birefringent pattern is a kit comprising at least two viewers.

15. The authenticity-verifying medium according to claim 13, wherein the at least two viewers are different from each other in terms of optical axes and/or a retardation of an optically anisotropic layer arranged at the side of a member to be authenticated.

16. The authenticity-verifying medium according to claim 11, wherein the viewer is comprised as a part of a member to be authenticated.

17. A method of verifying authenticity of the authenticity-verifying medium according to claim 11, comprising the step of observing a member to be authenticated through the viewer.

18. A method of verifying authenticity of the authenticity-verifying medium according to claim 11, comprising the step of observing a member to be authenticated through the kit.

19. The method of verifying authenticity according to claim 16, comprising the steps of observing a member to be authenticated in which the birefringent pattern is formed in an authentic product through the viewer for authenticating a birefringent pattern; and
- confirming a latent image composed of at least three colors, thereby verifying authenticity of the member to be authenticated.

20. The method of verifying authenticity according to claim 17, comprising the steps of: observing a member to be authenticated in which the birefringent pattern is formed in an authentic product through the kit for authenticating a birefringent pattern; and
- confirming a latent image composed of at least three colors, thereby verifying authenticity of the member to be authenticated.

* * * * *